(12) United States Patent
Ling et al.

(10) Patent No.: US 12,056,843 B2
(45) Date of Patent: Aug. 6, 2024

(54) METHODS AND SYSTEMS FOR IMAGE PROCESSING

(71) Applicant: ZHEJIANG DAHUA TECHNOLOGY CO., LTD., Zhejiang (CN)

(72) Inventors: Chen Ling, Hangzhou (CN); Xin Ma, Hangzhou (CN); Wei Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 475 days.

(21) Appl. No.: 17/304,945

(22) Filed: Jun. 29, 2021

(65) Prior Publication Data
US 2021/0327023 A1 Oct. 21, 2021

Related U.S. Application Data

(63) Continuation of application No. PCT/CN2018/125755, filed on Dec. 29, 2018.

(51) Int. Cl.
*G06T 5/00* (2024.01)
*G06T 3/4015* (2024.01)
*G06T 3/4084* (2024.01)
*G06T 7/90* (2017.01)

(52) U.S. Cl.
CPC ......... *G06T 3/4015* (2013.01); *G06T 3/4084* (2013.01); *G06T 7/90* (2017.01)

(58) Field of Classification Search
CPC . G06T 5/00–50; G06T 3/4015; G06T 3/4084; G06T 7/90; H04N 19/85–865
See application file for complete search history.

(56) References Cited

U.S. PATENT DOCUMENTS

| 6,163,628 | A | 12/2000 | Ibenthal et al. |
| 2008/0158407 | A1 | 7/2008 | Funamoto |
| 2010/0220939 | A1 | 9/2010 | Tourapis et al. |
| 2011/0286529 | A1* | 11/2011 | Meggers ............. H04N 19/192 375/E7.2 |
| 2015/0036794 | A1 | 2/2015 | Hsieh |
| 2015/0363666 | A1 | 12/2015 | Senzaki et al. |

(Continued)

FOREIGN PATENT DOCUMENTS

| AU | 2015258162 A1 | 12/2015 |
| CN | 103679641 A | 3/2014 |

(Continued)

OTHER PUBLICATIONS

International Search Report in PCT/CN2018/125755 mailed on Sep. 26, 2019, 4 pages.

(Continued)

*Primary Examiner* — Sean T Motsinger
(74) *Attorney, Agent, or Firm* — METIS IP LLC

(57) ABSTRACT

Methods and systems are provided for processing an image. The method may include selecting one or more tiles in a first image. The method may also include performing, for each of the one or more tiles, an image processing operation on an image processing region within the tile based on a second image for K iterations, decreasing the size of the image processing region with each iteration, wherein K is an integer above 2.

20 Claims, 12 Drawing Sheets

(56) References Cited

U.S. PATENT DOCUMENTS

| | | |
|---|---|---|
| 2016/0042498 A1 | 2/2016 | Russell |
| 2016/0366387 A1 | 12/2016 | Eguchi |
| 2017/0084007 A1 | 3/2017 | Rakhshanfar et al. |
| 2019/0037138 A1 | 1/2019 | Choe et al. |
| 2021/0327023 A1* | 10/2021 | Ling ................. G06T 7/90 |
| 2023/0244190 A1* | 8/2023 | Chen ............... H04L 1/205 |
| | | 700/37 |

FOREIGN PATENT DOCUMENTS

| | | |
|---|---|---|
| CN | 103810692 A | 5/2014 |
| CN | 103997592 A | 8/2014 |
| CN | 104240211 A | 12/2014 |
| CN | 103369209 B | 8/2016 |
| CN | 105959512 A | 9/2016 |
| CN | 106303157 A | 1/2017 |
| CN | 106412385 A | 2/2017 |
| CN | 106612386 A | 5/2017 |
| CN | 106897983 A | 6/2017 |
| CN | 107437238 A | 12/2017 |
| CN | 107564018 A | 1/2018 |
| CN | 107909058 A | 4/2018 |
| EP | 2089647 B1 | 8/2014 |

OTHER PUBLICATIONS

Written Opinion in PCT/CN2018/125755 mailed on Sep. 26, 2019, 4 pages.

The Extended European Search Report in European Application No. 18945063.8 mailed on Nov. 22, 2021, 10 pages.

Ding, Chang et al., Image Details Enhancement by Gradient Field Bi-interval Equalization, Acta Electronica Sinica, 45(5): 1165-1174, 2017.

Rajlaxmi Chouhan et al., Image Enhancement and Dynamic Range Compression Using Novel Intensity-Specific Stochastic Resonance-Based Parametric Image Enhancement Model, IEEE International Conference on Image Processing, 4532-4536, 2014.

* cited by examiner

Processing module 500

Image processing region unit 510

Window region unit 520

First pixel block unit 530

Second pixel block unit 540

Difference indicator unit 550

Pixel modification unit 560

First detection unit 570

Second detection unit 580

810 — Obtain a low-frequency component $V_{1,i\_l}$ of the pixel $P_{1,i}$ and a low-frequency component $V_{2,i\_l}$ of the pixel $P_{2,i}$

820 — Obtain a high-frequency component $V_{1,i\_h}$ of the pixel $P_{1,i}$ and a high-frequency component $V_{2,i\_h}$ of the pixel $P_{2,i}$

830 — Obtain weights $w_{1,i}$ and $w_{2,i}$ associated with the pixels $P_{1,i}$ and $P_{2,i}$ based on at least the difference indicator $D_i$

840 — Compute an updated high-frequency component $V'_{1,i\_h}$ for the pixel $P_{1,i}$ based on the high-frequency components $V_{1,i\_h}$, $V_{2,i\_h}$, and the weights associated with the pixels $P_{1,i}$ and $P_{2,i}$

850 — Compute the output value $O_i$ based on the updated high-frequency component $V'_{1,i\_h}$ and the low-frequency component $V_{1,i\_l}$

METHODS AND SYSTEMS FOR IMAGE PROCESSING

CROSS-REFERENCE TO RELATED APPLICATIONS

This application is a Continuation of International Application No. PCT/CN2018/125755, filed on Dec. 29, 2018, the entire contents of which are hereby incorporated by reference.

TECHNICAL FIELD

The present disclosure generally relates to digital image processing, and specifically relates to methods and systems for noise reduction.

BACKGROUND

During the generation, transmission, and compression, etc., a digital video stream may be affected by noise. Noise may be produced by an image sensor for generating the video stream or by transmission of the video stream over analog channels and may affect the entire image processing pipeline, causing a serious reduction of the visual effect of the digital video stream. Therefore, there is a need to reduce noise in the digital video stream.

SUMMARY

According to an aspect of the present disclosure, a method for processing an image is provided. The method may include selecting one or more tiles in a first image. The method may also include performing, for each of the one or more tiles, an image processing operation on an image processing region within the tile based on a second image for K iterations, decreasing the size of the image processing region with each iteration, wherein K is an integer above 2.

In some embodiments, in each iteration of the K iterations, the image processing operation may modify pixel values of one or more pixels within the imagine processing region. The one or more modified pixels may form a processed region having a size smaller than the size of the corresponding image processing region. The method may further include designating the processed region of a current iteration as the image processing region of a next iteration.

In some embodiments, the performing an image processing operation on an image processing region may include, in each iteration of the K iterations: setting one or more window regions by running a sliding window on the image processing region, wherein each of the one or more window regions may correspond to a first block of pixels of the first image, the first block of pixels including a first pixel of interest; and determining an output value for each of the one or more window regions to modify the first pixel of interest.

In some embodiments, the determining an output value for each of the one or more window regions may include: obtaining, from the second image, a second block of pixels corresponding to the first block of pixels, the second block of pixels including a second pixel of interest corresponding to the first pixel of interest; computing a difference indicator indicating a difference between the first block of pixels and the second block of pixels; and computing the output value based on at least the difference indicator, a pixel value of the first pixel of interest, and a pixel value of the second pixel of interest.

In some embodiments, the first image and the second image may be formatted according to a filter color array.

In some embodiments, in some embodiments, the method may further include generating the first image and the second image by an image sensor covered by the color filter array.

In some embodiments, the computing the difference indicator may include: computing a first mean of pixel values of pixels having a predetermined color in the first block of pixels; computing a second mean of pixel values of pixels having the predetermined color in the second block of pixels; and determining the difference indicator at least based on a difference between the first mean and the second mean.

In some embodiments, the computing the output value may include: obtaining a first high-frequency component of the first pixel of interest and a first low-frequency component of the first pixel of interest; obtaining a second high-frequency component of the second pixel of interest; computing an updated high-frequency component of the first pixel of interest at least based on the first difference indicator, the first high-frequency component, and the second high-frequency component; and obtaining the output value based on the updated high-frequency component of the first pixel of interest and the first low-frequency component.

In some embodiments, the computing the updated high-frequency component of the first pixel of interest may include: obtaining, based at least on the first difference indicator, weights associated with the first pixel of interest and the second pixel of interest; and computing a weighted sum or weighted mean of the original high-frequency component of the first pixel of interest and the high-frequency component of the second pixel of interest as the updated high-frequency component.

In some embodiments, the method may further include, in at least one iteration of the K iterations, for each of the one or more window regions: determining a brightness indicator indicating a brightness of the first block of pixels. The first weight and the second weight may be determined based further on the brightness indicator.

In some embodiments, the second image may be obtained by processing a third image. In at least one iteration of the K iterations, for each of the one or more window regions, the first weight and the second weight may be determined based further on a reference parameter associated with the second pixel of interest. The method may further include, in the Kth iteration of the K iterations, for each of the one or more window regions of the Kth iteration, storing the first difference indicator as the reference parameter associated with the first pixel of interest.

According to another aspect of the present disclosure, a system for processing an image is provided. The system may include a storage medium including a set of instructions, and at least one processor in communication with the storage medium. When executing the set of instructions, the at least one processor may select one or more tiles in a first image, and perform, for each of the one or more tiles, an image processing operation on an image processing region within the tile based on a second image for K iterations, decreasing the size of the image processing region with each iteration, wherein K is an integer above 2.

According yet to another aspect of the present disclosure, a non-transitory computer readable medium is provided. The non-transitory computer readable medium may include at least one set of instructions compatible for processing an image. When executed by logical circuits of an electronic device, the at least one set of instructions may direct the logical circuits to select one or more tiles in a first image, and perform, for each of the one or more tiles, an image processing operation on an image processing region within the tile based on a second image for K iterations, decreasing the size of the image processing region with each iteration, wherein K is an integer above 2.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a schematic diagram illustrating an exemplary processing module according to some embodiments of the present disclosure;

FIG. 8 is a flowchart illustrating an exemplary process for modifying a pixel of interest in a pixel block according to some embodiments of the present disclosure;

FIGS. 10 to 15 are schematic diagrams illustrating the process illustrated in FIG. 9 according to some embodiments of the present disclosure.

DETAILED DESCRIPTION

Figure 1:
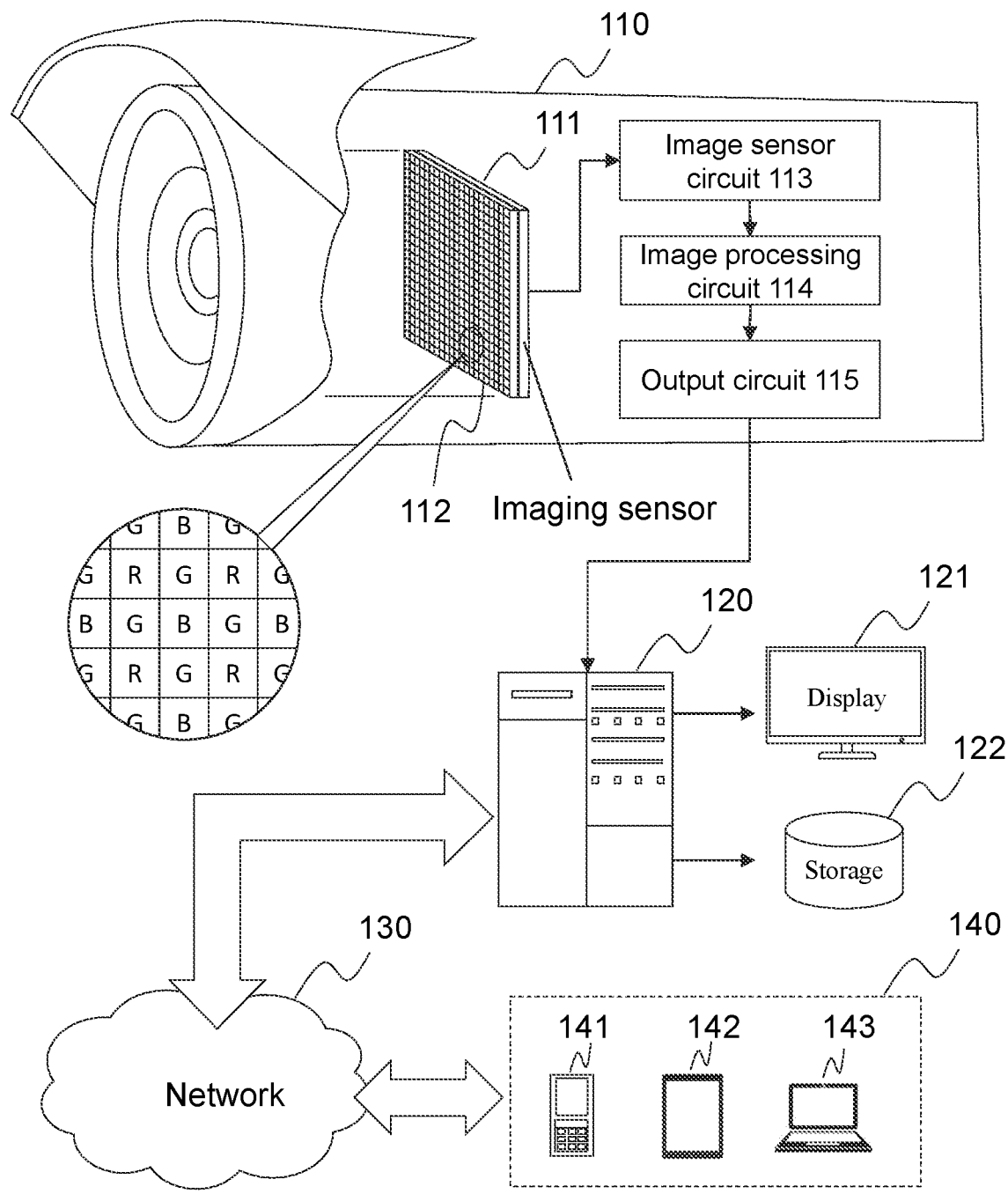
FIG. 1 is a schematic diagram illustrating an exemplary image processing system according to some embodiments of the present disclosure.

The present disclosure provides image processing methods and systems for processing a first image based on a second image. The image processing process may be performed for a plurality of iterations, and the image processing region may be decreased with each iteration. In some embodiments, the first image and the second image may be two successive frames of a digital video stream, and the image processing process may be performed to reduce noise in digital video stream frame by frame.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Figure 2:
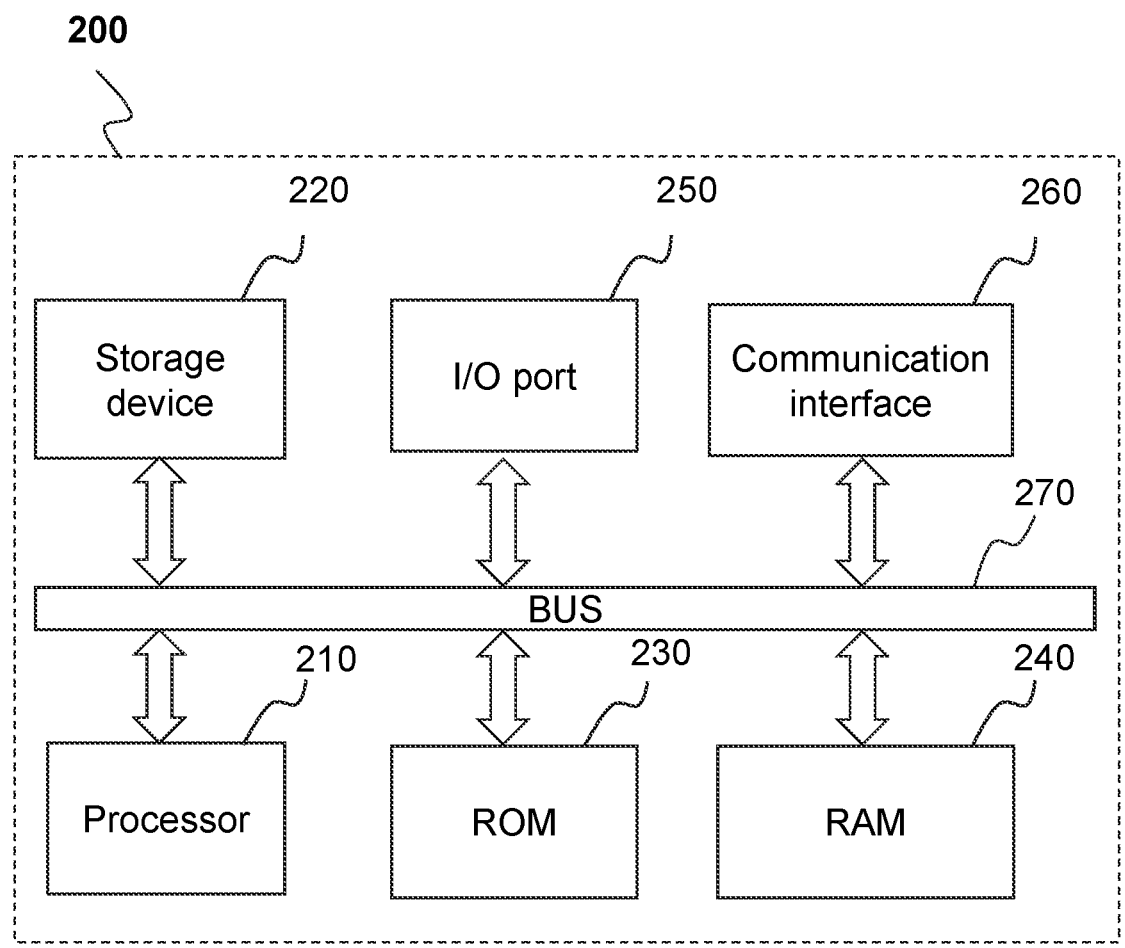
FIG. 2 is a schematic diagram illustrating an exemplary computing device.

Software modules/units/blocks configured for execution on computing devices or logical circuits (e.g., image processing circuit 114 as illustrated in FIG. 1 and processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

FIG. 1 is a schematic diagram illustrating an exemplary image processing system according to some embodiments of the present disclosure. The image processing system 100 may include a camera 110, a console 120, a network 130, and one or more terminal devices 140. In some embodiments, the image processing system 100 may further include other components based on actual needs.

The camera 110 may be configured to capture an image or a video stream. The camera 110 may include an image sensor circuit 113, an image processing circuit 114, and an output circuit 115. It may be noted that, the simplified structure of the camera 110 illustrated in FIG. 1 is only for demonstration purposes and not intended to be limiting.

The image sensor circuit 113 may generate a raw digital image or a raw digital video stream of a scene. The image sensor circuit 113 may include or be in communication with an image sensor 111 (e.g., a CMOS sensor, a CCD sensor) for sensing light from scene. The image sensor 111 may be in the form of a photosensor array. A color filter array 112 may be placed over the image sensor 111 (or the photosensor array), so that each photosensor of the image sensor 111 may be responsive to a single color, and the output signal of the photosensor may only represent the corresponding color. The output signals of the pixel array may be received by the image sensor circuit 113 for generating the raw digital image or the raw digital video stream. The generated raw digital image or the raw digital video stream may be formatted according to the color filter array 112. Each pixel of the raw digital image or a frame of the raw digital video may only have one pixel value of a corresponding color.

For simplicity, in the present disclosure, a digital image, a frame of a digital video, and signal form or data form thereof, may be referred to as an image in the present disclosure. For example, a raw digital image, a frame of a raw digital video, and the signal form or data form thereof, may be referred to as a raw image.

The color filter array 112 may be any proper color filter array in the art, such as a Bayer filter, an RGBE filter, a CYYM filter, a CYGM filter, an RGBW Bayer filter, or the like, or a combination thereof. Merely for example, the color filter array 112 may be a Bayer filter. The raw image generated by the image sensor circuit 113 may be formatted according to the Bayer filter. An image (such as the raw image) formatted according to a Bayer filter may be referred to as a Bayer image. The color space of a Bayer image may be an RGB color space including an R channel (red), a G channel (green), and a B channel (blue). Each pixel of a Bayer image may only have one pixel value corresponding to one of the three color channels.

The image processing circuit 114 may process the raw image generated by the image sensor circuit 113 via an image processing pipeline, which may perform, in a predetermined sequence, a plurality of image processing operations on the raw image generated by the image sensor circuit 113, such as a noise reduction, a demosaicing operation, a color balance, an image reconstruction, an image sharpening, a blur reduction, a defective pixel correction, or the like, or a combination thereof. Each of the plurality of image processing operations may receive an output image of a preceding image processing operation as the input image (for the first image processing operation the input image is the raw image), and then process the input image to generate the corresponding output image. The output image of each of the plurality of image processing operations except the last image processing operation may be referred to as an intermediate image.

In some embodiments, the image processing circuit 114 may perform a demosaicing operation on the raw image or an intermediate image to reconstruct a full color image. Each pixel of a full color image may have multiple pixel values corresponding to all the color channels. Before the demosaicing operation, all the intermediate images generated by an earlier image processing operations (as well as the raw image) may be formatted according to the color filter array 112. After the demosaicing operation, all the intermediate images generated by the later image processing operations (if any) and the final output image of the image processing pipeline may be a full color image.

In some embodiments, the image processing operation(s) after the demosaicing operation may include a format conversion operation changing the format or color space of the corresponding input image (e.g., from an RGB color space to a YUV color space) to facilitate the compression or transmission of the final output image.

The image processing circuit 114 may perform the image processing processes described in the present disclosure on an image formatted according to the color filter array (the raw image, an intermediate image) or a full-color image (e.g., a demosaiced image) to implement all kinds of image processing, such as noise reduction, blur reduction, color correction, lens correction, image enhancing, etc.

In some embodiments, the image processing processes described in the present disclosure may be performed on an image formatted according to the color filter array for noise reduction, so that the downstream process(es) of the image processing pipeline may not be affected by noise.

In some embodiments, the processes described in the present disclosure may be performed to achieve multiple types of image processing (e.g., noise reduction and color correction) simultaneously.

The image processing circuit 114 may be implemented as hardware circuits, a programmed processor, or the like, or a combination thereof. For example, the image processing circuit 114 may include one or more image processors implementing the image processing pipeline. The image processing circuit 114 may include one or more logical circuits, integrated chips, or processors to perform the image processing processes described in the present disclosure.

The final output image of the image processing pipeline may be transmitted to the output circuit 115. The output circuit 115 may output the image via one or more cables or the network 130.

In some embodiments, the output circuit 115 may transmit the image (or video frame) processed by the image processing circuit 114 in the form of analog signals or digital signals to the console 120 via one or more cables. After receiving the signals, the console 120 may display the image via a display 121 or store the image in a storage device 122. Alternatively or additionally, the console 120 may transmit the image to one or more terminal devices 140 via the network 130.

In some embodiments, the output circuit 115 may transmit the image (or video) to one or more terminal devices 140 and/or the console 120 via the network 130. The output circuit 115 may include a circuit or component for communicating with the network 130.

The console 120 may transmit control signals to the camera 110 and receive images (or videos) from the camera 110. The console 120 may be a computer or a group of computers. In some embodiments, the console 120 may be an on-board computing device mounted on a vehicle.

The console 120 may be in communication with the display 121 to display the received images and/or the storage device 122 to store the received images. In some embodiments, the storage device 122 and/or the display 121 may be a part of the console 120, or be coupled to the console 120 via one or more cables. In some embodiments, the console 120 may communicate with the storage device 122 and/or the display 121 via the network 130.

In some embodiments, the image processing processes described in the present disclosure may be performed by the console 120, or one or more processors included in the console 120. The image to be processed (an image formatted according to the color filter array 112 or a full color image) may be transmitted by the output circuit 115 to the console 120, and the image processing circuit 114 may be optional.

In some embodiments, the camera 110 may also be powered by the console 120. For example, the camera 110 and the console 120 may be coupled via a coaxial cable. By adopting a power over coax (POC) technique, the coaxial cable may transmit image signals from the camera 110 to the console 120 and a DC current from the console 120 to the camera 110 simultaneously. The output circuit 115 and the console 120 may both have a circuit or component for separating the image signal and the DC current. Noises caused by such a transmission as well as other noises may also be reduced via the image processing processes described in the present disclosure (when performed by the console 120).

In some embodiments, a plurality of cameras that are the same as or similar to the camera 110 may be in communication with the console 120. The image processing circuits 114 of the plurality of cameras may process the images captured by the plurality of cameras in parallel. The output images of the plurality of cameras may be received by the console 120. The console 120 may generate a panorama or a three-dimensional (3D) image based on the received images.

The network 130 may include any suitable network that may facilitate a transmission of data and signals between the components of image processing system 100. For example, the network 130 may facilitate a transmission of image data from the camera 110 to the console 120 and/or a transmission of control signals from the console 120 to the camera 110.

The network 130 may be and/or include one or more types of networks. For example, the network 130 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a Bluetooth™ network, a ZigBee™ network, a near field communication (NFC) network, or the like, or any combination thereof. The network 130 may also include wired and/or wireless network access points, such as base stations, internet exchange points, routers, hubs, gateways, switches, server computers, and/or any combination thereof.

The terminal device 140 may receive images or videos from the camera 110 or the console 120 via the network 130. The terminal device 140 may include a mobile computing device 141, a tablet computer 142, a laptop computer 143, a smart home device (not shown), a desktop computer (now shown) or the like, or any combination thereof. In some embodiments, the mobile computing device 141 may include a wearable device, a mobile phone, a virtual reality device, an augmented reality device, a personal digital assistance (PDA), a navigation device, or the like, or any combination thereof.

It should be noted that above descriptions about the image processing system 100 are merely for illustration purposes, and not intended to limit the scope of the present disclosure. It is understandable that, after learning the major concept and the mechanism of the present disclosure, a person of ordinary skills in the art may alter the system 100 in an uncreative manner. The alteration may include combining and/or splitting certain devices/components/modules/units, adding or removing optional devices/components/modules/units, changing the connection state of the devices/components/modules/units, applying the image processing system 100 in a relative field, or the like, or any combination thereof. All such modifications are within the scope of the present disclosure.

FIG. 2 is a schematic diagram illustrating an exemplary computing device. Computing device 200 may be configured to implement the camera 110 and/or the console 120, and perform one or more operations disclosed in the present disclosure. The computing device 200 may be configured to implement various modules, units, and their functionalities described in the present disclosure.

The computing device 200 may include a bus 270, a processor 210 (or a plurality of processors 210), a read only memory (ROM) 230, a random access memory (RAM) 240, a storage device 220 (e.g., massive storage device such as a hard disk, an optical disk, a solid-state disk, a memory card, etc.), an input/output (I/O) port 250, and a communication interface 260. It may be noted that, the architecture of the computing device 200 illustrated in FIG. 2 is only for demonstration purposes, and not intended to be limiting. The computing device 200 may be any device capable of performing a computation.

The bus 270 may couple various components of computing device 200 and facilitate transferring of data and/or information between them. The bus 270 may have any bus structure in the art. For example, the bus 270 may be or may include a memory bus and/or a peripheral bus. The I/O port 250 may allow a transferring of data and/or information between the bus 270 and one or more other devices (e.g., the camera 110, the console 120, a touch screen, a keyboard, a mouse, a microphone, a display, a loudspeaker). The communication interface 260 may allow a transferring of data and/or information between the network 130 and the bus 270. For example, the communication interface 260 may be or may include a network interface card (NIC), a Bluetooth™ module, an NFC module, etc.

The ROM 230, the RAM 240, and/or the storage device 220 may be configured to store instructions that may be executed by the processor 210. The RAM 240, and/or the storage device 220 may also store date and/or information generated by the processor 210 during the execution of the instruction.

The processor 210 may be or include any processor in the art configured to execute instructions stored in the ROM 230, the RAM 240, and/or the storage device 220, so as to perform one or more operations or implement one or more modules/units disclosed in the present disclosure. Merely by way of example, the processor 210 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, one or more of the components of the computing device 200 may be implemented on a single chip. For example, the processor 210, the ROM 230, and the RAM 240 may be integrated into a single chip.

In some embodiments, one of the I/O port 250 and the communication interface 260 may be removed from the computing device 200.

In some embodiments, the computing device 200 may implement the camera 110. The image sensor circuit 113 may also be coupled to the bus 270. The image processing circuit 114 may be implemented on the processor 210. The I/O port 250 and/or the communication interface 260 may implement the output circuit 115.

In some embodiments, the computing device 200 may implement the console 120. The computing device 200 may be a single device. Alternatively, the computing device 200 may include a plurality of computing devices having a same or similar architecture as illustrated in FIG. 2, and one or more components of the computing device 200 may be implemented on one or more of the plurality of computing devices.

In some embodiments, the computing device 200 may implement a personal computer (PC) or any other type of work station or terminal device. The computing device 200 may also act as a server if appropriately programmed.

Figure 3:
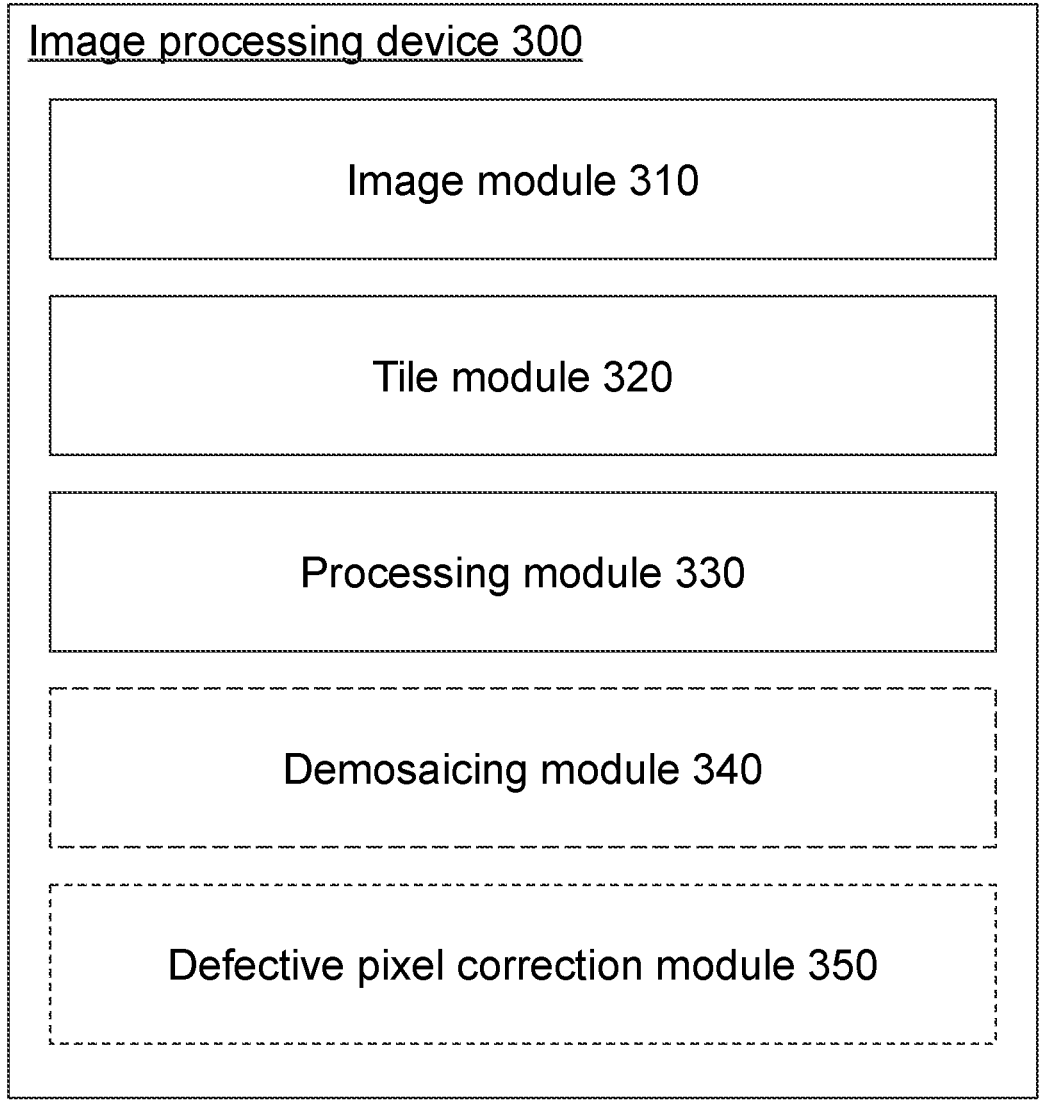
FIG. 3 illustrates an exemplary image processing device according to some embodiments of the present disclosure.

FIG. 3 illustrates an exemplary image processing device 300 according to some embodiments of the present disclosure. The image processing device 300 may be implemented on the image processing circuit 114 or the console 120 to process an image via a process illustrated in, e.g., FIG. 4. The image processing device 300 may include an image module 310, a tile module 320, and a processing module 330. In some embodiments, the image processing device 300 may further include a demosaicing module 340, and/or a defective pixel correction module 350.

The image module 310 may be configured to obtain a first image. The first image may be an image formatted according to a color filter array (e.g., a Bayer image), a full color image (e.g., an RGB image or a YUV image), or a greyscale image. The first image may be a raw image generated by the image sensor circuit 113, or an intermediate image produced during the image processing circuit 114 processing the raw image. Alternatively, the first image may be an image received by the console 120.

The tile module 320 may select one or more tiles in the first image. A "tile" may be a local region of an image including a block of pixels. A tile may have any predetermined shape. For illustration purposes, a "tile" having a rectangular (or square) grid may be described in the present disclosure. The tile module 320 may perform a predetermined sectioning on the first image to determine the plurality of tiles. Alternatively, the tile module 320 may run a sliding window on the first image to set a plurality of window regions on the first image. Each of the plurality of window regions may be a block of pixels which may be regarded as a tile.

The processing module 330 may perform, for each of the one or more tiles, an image processing operation on an image processing region within the tile based on a second image for K iterations, decreasing the size of the image processing region with each iteration. K may be an integer above 2. In each iteration of the K iterations, the processing module 330 may modify pixel values of one or more pixels (or be referred to as modify the one or more pixels) in the image processing region. The one or more modified pixels may form a processed region smaller than the corresponding image processing region.

Pixels in the second image may correspond to pixels in the first image. In some embodiments, the first image and the second image may be two successive frames of a digital video stream. Preferably, the second image may be a frame preceding the first image. However, the second image may also be a frame next to the first image.

The first image and the second image may have the same image format. In some embodiments, both of the first image and the second image may be formatted according to the color filter array 112. Alternatively, both of the first image and the second image may be full color images or greyscale images.

In some embodiments, both of the first image and the second image may be formatted according to the color filter array 112. The image processing device 300 may further include a demosaicing module 340. The demosaicing module 340 may perform a demosaicing operation on the image obtained by performing the image processing operation on the first image to convert the processed first image into a full color image for display or storage.

In some embodiments, the image processing device 300 may further include a defective pixel correction module 350. The defective pixel correction module 350 may detect defective pixels on an image for generating the first image (e.g., a raw image generated by the image sensor circuit 113), and correct the detected defective pixels on the image to generate a defective-pixel-corrected image. The defective-pixel-corrected image may serve as the first image to be processed. Alternatively, image processing device 300 may further process the defective-pixel-corrected image to generate the first image. By correcting the defective pixels before performing the image processing process described in the present disclosure, an enhanced image processing result may be achieved.

The image processing device 300 as well as its components may be further described in connection with an image processing process illustrated in FIG. 4.

It may be noted that, the above descriptions about the image processing device 300 are only for illustration purposes, and not intended to limit the present disclosure. It is understood that, after learning the major concept and the mechanism of the present disclosure, a person of ordinary skills in the art may alter the image processing device 300 in an uncreative manner. The alteration may include combining and/or splitting modules or sub-modules, adding or removing optional modules or sub-modules, etc. For example, the first image and the second image may be full-color images and the demosaicing module 340 may be removed from the image processing device 300. As another example, the first image and the second image may be raw images generated by the image sensor circuit 113, and the defective pixel correction module 350 may be removed from the image processing device 300. All such modifications are within the protection scope of the present disclosure.

Figure 4:
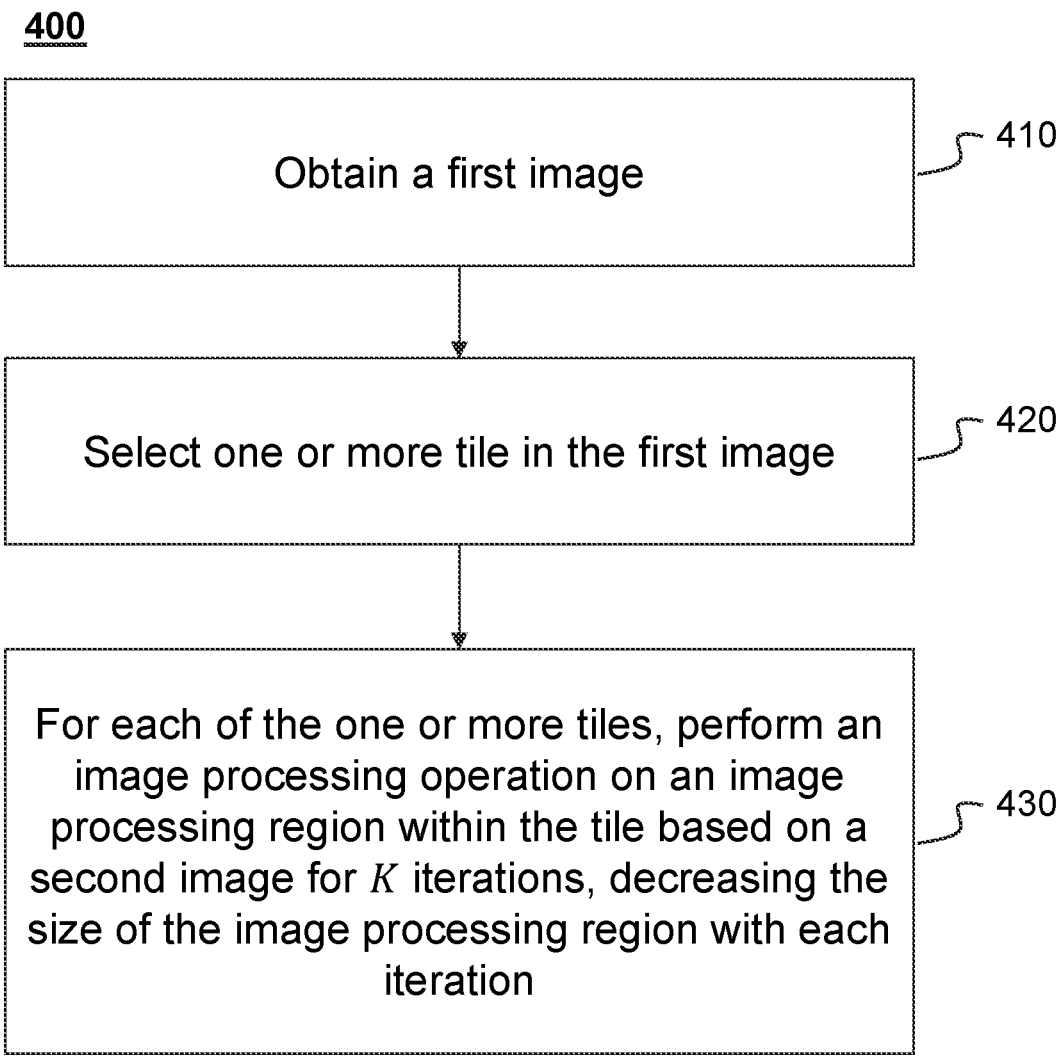
FIG. 4 is a flowchart illustrating an exemplary image processing process according to some embodiments of the present disclosure.

FIG. 4 is a flowchart illustrating an exemplary image processing process 400 according to some embodiments of the present disclosure. The process 400 may be performed by the image processing device 300 to reduce noise, reduce blur, and/or correct color, etc., in an image. In some embodiments, one or more operations of the process 400 illustrated in FIG. 4 may be implemented in the image processing system 100 illustrated in FIG. 1. For example, the process 400 illustrated in FIG. 4 may be stored in a storage device (e.g., the RAM 240, the storage device 220) in the form of instructions, and invoked and/or executed by one or more processors (e.g., the processor 210, the image processing circuit 114) implementing the corresponding module of the image processing device 300.

In 410, the image module 310 may obtain a first image. The first image may be an image formatted according to a color filter array (e.g., a Bayer image), a greyscale image, or a full color image. In some embodiments, the first image may be a frame of a digital video stream. The image module 310 may obtain the first image from the image sensor circuit 113, the output circuit 115, the network 130, or a built-in storage device (e.g., the storage device 220, the RAM 240).

In 420, the tile module 320 may select one or more tiles in the first image.

In some embodiments, the tile module 320 may set a plurality of tiles in the first image, and select a tile from the plurality of tiles according to a predetermined sequence to process the plurality of tiles one by one.

In some embodiments, the tile module 320 may set a plurality of tiles in the first image, and select a batch of tiles from the plurality of tiles according to a predetermined sequence to process the plurality of tiles batch by batch. For example, the image processing device 300 may be implemented by a plurality of processors, and each time the plurality of processors may process a corresponding number of tiles in parallel.

In some embodiments, the tile module 320 may perform a predetermined sectioning on the first image to divide the first image into a plurality of non-overlapping image regions as the plurality of tiles. The tiles may have predetermined sizes and shapes. In some embodiments, the tiles may be rectangular (or square) and may have a size of $T_w \times T_h$. $T_w$ may be a positive integer representing the number of pixels in width, and $T_h$ may be a positive integer representing the number of pixels in height. $T_w$ may be equal to or be different from $T_h$.

$T_w$ and $T_h$ may be set based on the hardware configuration of the camera 110. Alternatively or additionally, $T_w$ and $T_h$ may be set based on the purpose (e.g., for reducing noise, for correcting color) and/or the performance of the process 400. In some embodiments, both of $T_w$ and $T_h$ may be 13.

Preferably, the tiles determined by the tile module 320 may have a same shape and a same size. However, in some embodiments, the width/height of the first image may not be an integer multiple of the width/height of a tile. For example, the width of the first image may be 1024 pixels, and the predetermined width of a tile may be 13 pixels. Consequently, the tiles determined at the edge of the first image may have different width/height compared to other tiles. For example, in the above case, along the width of the first image, the tile module 320 may determine seventy eight tiles with a width of 13 pixels and one tile with a width of 10 pixels. Alternatively, the tile module 320 may pad zeroes at the edge of the first image so that the width/height of the first image may be increased to a next integer multiple of the width/height of a tile. For example, in the above case, along the width of the first image, the tile module 320 may pad zeroes at the edge of the first image to increase its width to 1027, and determine seventy nigh tiles in width.

In some embodiments, the tile module 320 may divide the first image into a plurality of overlapping image regions as a plurality of tiles. In such embodiments, only part of the pixels in each tile may be modified in the subsequent operation(s) of the process 400. A region (processed region) formed by pixels to be modified in a tile may not be overlapped with another tile, so that a modification of pixels in one tile may not affect a modification of pixels in another tile.

In 430, the processing module 330 may perform, for each of the plurality of tiles, an image processing operation on an image processing region within the tile based on a second image for K (K≥2) iterations, decreasing the size of the image processing region with each iteration.

During each iteration, by performing the image processing operation associated with the iteration, the processing module 330 may modify pixel values of one or more pixels in the image processing region. The one or more modified pixels may form a processed region. The size of the processed region may be equal to or smaller than the size of the corresponding image processing region.

The image processing region may be formed by all the pixels used for modifying the modified pixel(s). However, not all the pixels in the image processing region are necessarily be modified. In some embodiments, pixels at or near (e.g., 1~2 pixels away) the edges of an image processing region may not be modified.

The initial image processing region (i.e., the image processing region corresponding to the first iteration of the K iterations) may be the corresponding tile itself. The size of the image processing region and the processed region may be decreasing with each iteration. For example, the image processing region of a k+1th iteration may be within the image processing region of a kth iteration (1≤k≤K) in the K iterations, and the processed region of the k+1th iteration may also be within the processed region of the kth iteration.

In some embodiments, the image processing regions and the processed regions of the K iterations may each have a center at or near (e.g., one or two pixels away) the center of the corresponding tile. Consequently, pixels near the center of a tile may be processed for more iterations than pixels near the edges of the tile, and a gradual change of the image processing strength applied on the tile from the edge to the center may be achieved. Compared to traditional image processing techniques using the same image processing strength to process the whole tile (e.g., for noise reduction), the processes disclosed in the present disclosure (e.g., the process 400) may reduce the mosaic effect caused by applying different image processing strength on different tiles while providing sufficient image processing strengths.

In some embodiments, in each iteration of the K iterations, the processed region may be smaller than the corresponding image processing region. For example, pixels at or near (e.g., one or two pixels away) the edges of the image processing region may not be processed (i.e., the pixel values are not modified). The processing module 330 may designate the processed region of a Kth iteration as the image processing region of a k+1th iteration to decrease the image processing region with each iteration.

Each iteration of the K iterations may be associated with one or more image processing models for modifying pixel values of one or more pixels in the image processing region. The one or more image processing models may include a model for reducing noise, a model for reducing blur, a model for correcting color, or the like, or a combination thereof.

All the K iterations may be associated with a same image processing model or a same set of image processing models. Alternatively, two or more iterations of the K iterations may be associated with different image processing models. It is noted that, image processing models adopting a same concept but different parameters may also be considered as different image processing models. For example, two or more iterations of the K iterations may be associated with image processing models for reducing noise using different sets of parameters. Such a configuration may vary the strength of the noise reduction (or other image processing techniques) in each iteration to enhance the visual effect of the processed image.

In some embodiments, K may be a predetermined number such as 2, 3, 4, etc. In some embodiments, K may be a default system parameter or be set by a user.

In some embodiments, K may depend on the performance or the result of the image processing operation in each iteration. The processing module 330 may keep performing the image processing operation iteratively until a termination condition is satisfied. For example, the termination condition may include that the size of the processed region or the size of the image processing region is less than or equal to a predetermined threshold. As another example, the termination condition may include that a difference (e.g., in the form of an $L^1$ distance (i.e., rectilinear distance) or an $L^2$ distance (i.e., Euclidean distance)) of the processed region before and after the current iteration is less than or equal to a predetermined threshold (i.e., a convergence is achieved).

In some embodiments, the processing module 330 may run a sliding window on the image processing region to set a plurality of overlapping window regions (or one window region if the size of the image processing region can only afford one window region) within the image processing region. Each position (or region) the sliding window moved to may correspond to a window region within the image processing region. The processing module 330 may compute an output value for each window region to modify a pixel of interest in the window region. Detailed descriptions may be found elsewhere in the present disclosure (e.g., in connection with FIG. 6).

In some embodiments, the first image may be a frame of a video, and the second image may be a preceding frame of the first image. By repeating the process 400, the image processing device 300 may process the video frame by frame. The processed first image may also serve as a "second image" for processing the next frame of the video.

In some embodiments, the image processing device 300 may be implemented by a plurality of processing cores (e.g., a group of computing devices, a plurality of single-core processors, cores of one or more multi-core processors, a plurality of logical circuits coupled in parallel in a computing device). Each of the plurality of processing cores may correspond to a block of photosensors in the photosensor array of the image sensor 111 for generating the first image. The plurality of processing cores may each retrieve the part of the first image generated by the corresponding block of photosensors as the selected tile in the operation 420 and perform the operation 430 on the selected tile in parallel to process the first image.

In some embodiments, the tile module 320 may run a sliding window on the first image to select the one or more tiles. By running the sliding window, the tile module 329 may set a plurality of window regions on the first image as a plurality of tiles. Each time the tile module 320 sets a window region with the sliding window to select a tile (operation 420), the processing module 330 may perform the operation 430 to process the tile, and then the tile module 320 may move the sliding window to set the next window region to select the next tile. The processing of an earlier selected tile may affect the processing of a later selected tile. Each time the tile module 320 may move the sliding window with a distance of one or more pixels (e.g., ½ width or ½ height of the sliding window) along the width or height of the first image to select the one or more tiles.

In some embodiments, before selecting the one or more tiles in the first image, the tile module 320 may determine one or more regions of interest in the first image, and then select the one or more tiles in the determined region(s) of interest (e.g., by sectioning or running a sliding window). For example, the tile module 320 may perform an object detection on the first image to detect an image region including or potentially including one or more specific objects (e.g., a face) as a region of interest. As another example, the tile module 320 may perform an abnormality detection on the first image to detect an image region including or potentially including one or more abnormalities to be treated via the process 400 as a region of interest. The one or more abnormalities may include noise (e.g., over a predetermined level), distortion, blur, pseudo color, overexposure, underexposure, or the like, or a combination thereof.

In some embodiments, an aforementioned region of interest may serve as a tile determined by the tile module 320.

It should be noted that the above descriptions of the process 400 are only for demonstration purposes, and not intended to limit the scope of the present disclosure. It is understandable that, after learning the major concept of the present disclosure, a person of ordinary skills in the art may alter the process 400 in an uncreative manner. For example, the operations above may be implemented in an order different from that illustrated in FIG. 4. One or more optional operations may be added to the flowcharts. One or more operations may be split or be combined. All such modifications are within the scope of the present disclosure.

FIG. 5 is a schematic diagram illustrating an exemplary processing module 500 according to some embodiments of the present disclosure. In some embodiments, the image processing module 500 may be an example of the processing module 330. The processing module 500 may be implemented on the image processing circuit 114 or the console 120 to process an image via a process illustrated in FIG. 6 or an embodiment thereof. The processing module 500 may include an image processing region unit 510, a window region unit 520, a first pixel block unit 530, a second pixel block unit 540, a difference indicator unit 550, a pixel modification unit 560, a first detection unit 570, and a second detection unit 580. It should be noted that, one or more units of the processing module 500 may be combined or split. One or more optional unit may be added according to actual needs.

The image processing region unit 510 may be configured to set an image processing region for each iteration of the K iterations, and decrease the size of the image processing region with each iteration.

The window region unit 520 may be configured to set one or more window regions by running a sliding window on the image processing region. During the running of the sliding window, the window region unit 520 may sequentially move the sliding window to one or more positions within the image processing region. Each of the one or more positions may correspond to a window region in the image processing region. The window region may correspond to (or formed by) a block of pixels (or be referred to as a pixel block) in the first image.

The first pixel block unit 530 may be configured to obtain, from the first image, a first pixel block corresponding to the window region. The first pixel block may include a first pixel of interest.

The second pixel block unit 540 may be configured to obtain, from the second image, a second pixel block corresponding to the first pixel block. The second pixel block may include a second pixel of interest corresponding to the first pixel of interest. In some embodiments, the coordinates range of the first pixel block and the second pixel block may be the same.

The difference indicator unit 550 may be configured to compute a difference indicator indicating a difference between the first pixel block and the second pixel block. The difference indicator unit 550 may compute the difference indicator based on all the pixels in the first pixel block and the second pixel block, or selected pixels (e.g., of a certain color) in the first pixel block and the second pixel block.

The pixel modification unit 560 may be configured to compute an output value to modify the first pixel of interest based on at least the difference indicator, a pixel value of the first pixel of interest, and a pixel value of the second pixel of interest.

The first detection unit 560 may be configured to detect whether the processing of the image processing region is completed and operate in accordance with the detection result.

The second detection unit 570 may be configured to detect whether the processing of the tile is completed and operate in accordance with the detection result.

The units of the processing module 500 and their functions may be further described in connection with FIG. 6.

It may be noted that, the above descriptions about the processing module 500 are only for illustration purposes, and not intended to limit the present disclosure. It is understood that, after learning the major concept and the mechanism of the present disclosure, a person of ordinary skills in the art may alter the processing module 500 in an uncreative manner. The alteration may include combining and/or splitting units or sub-units, adding or removing optional units or sub-units, etc. For example, the first pixel block unit 530 and the second pixel block unit 540 may be combined as one unit. As another example, the first detection unit 570 and the second detection unit 580 may be combined as one unit. All such modifications are within the protection scope of the present disclosure.

Figure 6:
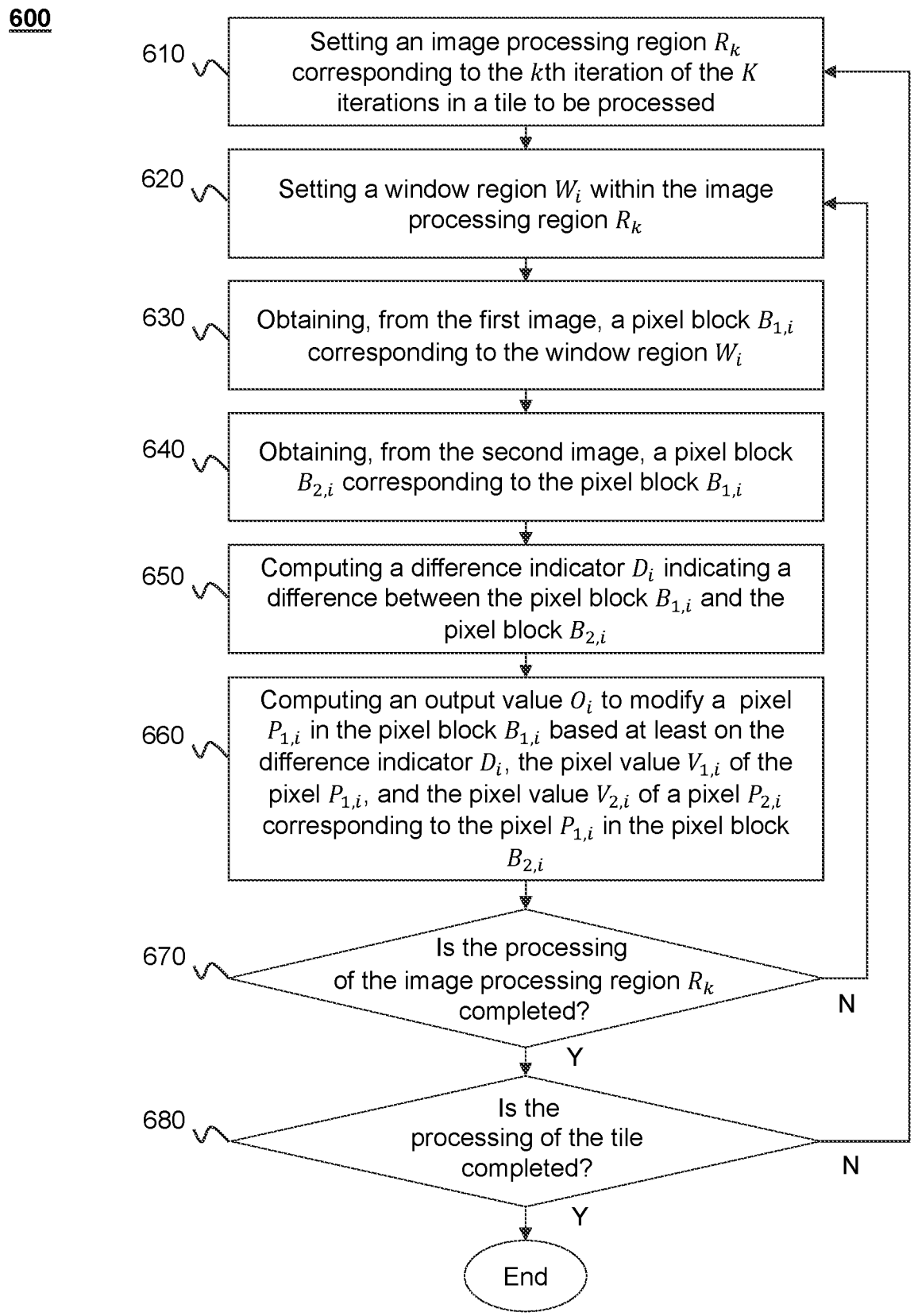
FIG. 6 is a flowchart illustrating an exemplary image processing process according to some embodiments of the present disclosure.

FIG. 6 is a flowchart illustrating an exemplary image processing process 600 according to some embodiments of the present disclosure. In some embodiments, the process 600 may be performed by the processing module 500 illustrated in FIG. 5 to achieve operation 430 illustrated in FIG. 4. In some embodiments, one or more operations of process 600 illustrated in FIG. 6 may be implemented in the image processing system 100 illustrated in FIG. 1. For example, the process 600 illustrated in FIG. 6 may be stored in a storage device (e.g., the RAM 240, the storage device 220) in the form of instructions, and invoked and/or executed by one or more processors (e.g., the processor 210, the image processing circuit 114) implementing the processing module 500.

Via the process 600, the processing module 500 may run a sliding window on an image processing region to process a tile set in the operation 420. The processing module 500 may compute an output value for each position of the sliding window to modify a corresponding pixel.

For brevity, the process 600 may be described on the premise that the images are formatted according to a color filter array (e.g., a Bayer image). However, the process 600 may also be performed for processing a first image that is a greyscale image or a full color image (e.g., an RGB image, a YUV image).

In 610, the image processing region unit 510 may set an image processing region $R_k$ corresponding to the kth iteration of the K iterations ($1 \le k \le K$) in a tile to be processed. In some embodiments, when k=1, the image processing region unit 510 may set the whole tile as the image processing region $R_1$. When k>1, the image processing region $R_k$ may be smaller than the image processing region $R_{k-1}$ corresponding to the k−1th iteration. For example, if the image processing region $R_{k-1}$ is a 13×13 pixel matrix, the image processing region $R_k$ may be a 9×9 pixel matrix. The image processing region $R_k$ may be a sub-region of the image processing region $R_{k-1}$.

In some embodiments, the image processing region $R_k$ set by the image processing region unit 510 may have a center at or near (e.g., 1~2 pixels away) the center of the corresponding tile.

In 620, the window region unit 520 may set a window region $W_i$ within the image processing region $R_k$. i may be an integer between 1 and the total number of the window regions to be set by the window region unit 520 within the image processing region $R_k$ in the kth iteration. The window region $W_i$ may correspond to the ith position of the sliding window run by the window region unit 520. The size of the window region $W_i$ may be the same as the size of the sliding window. The width of the window region $W_i$ may be equal to or different from the height of the window region $W_i$. In some embodiments, the size of the window region may be 5×5 (in unit of pixel).

In some embodiments, the window regions set by the window region unit 520 may be of a fixed size (e.g., 5×5) for all the K iterations.

In some embodiments, the window regions set by the window region unit 520 may be of different sizes for two or more iterations of the K iterations. For example, the window region unit 520 may run a 7×7 (in unit of pixel) sliding window in a first iteration to determine 7×7 (in unit of pixel) window regions and run a 5×5 (in unit of pixel) sliding window in a second iteration to determine 5×5 (in unit of pixel) window regions.

In some embodiments, the size of the sliding window associated with the kth iteration may be based on the image processing model(s) adopted in the kth iteration and/or the size/shape of the image processing region $R_k$.

In 630, the first pixel block unit 530 may obtain a pixel block $B_{1,i}$ (first pixel block) from the first image corresponding to the window region $W_i$. In some embodiments, the first pixel block unit 530 may read data corresponding to the pixel block $B_{1,i}$ from a storage device (e.g., the RAM 240, the storage device 220).

In 640, the second pixel block unit 540 may obtain a pixel block $B_{2,i}$ (second pixel block) from the second image corresponding to the pixel block $B_{1,i}$. In some embodiments, the first pixel block unit 530 may read data corresponding to the pixel block $B_{2,i}$ from a storage device (e.g., the RAM 240, the storage device 220).

The operations 630 and 640 may be performed in any sequence or be performed in parallel.

In 650, the difference indicator unit 550 may compute a difference indicator $D_i$ indicating a difference between the pixel block $B_{1,i}$ and the pixel block $B_{2,i}$.

The difference indicator unit 550 may compute the difference indicator $D_i$ based on all the pixels in the pixel block $B_{1,i}$ and all the pixels in the pixel block $B_{2,i}$. Alternatively, the difference indicator unit 550 may compute the difference indicator $D_i$ based on one or more pixels selected from the pixel Block $B_{1,i}$ and the corresponding pixels in the pixel block $B_{2,i}$. Some exemplary approaches for computing the difference indicator $D_i$ are listed as following, which are only for demonstration purpose and not intended to be limiting.

Approach a: The difference indicator unit 550 may compute an $L^1$ distance or $L^2$ distance between the pixel block $B_{1,i}$ and the pixel block $B_{2,i}$ as the difference indicator $D_i$ or as a basis for computing the difference indicator $D_i$.

Approach b: The difference indicator unit 550 may compute a mean $\overline{B}_{1,i}$ of pixel values of all the pixels in the pixel block $B_{1,i}$, and a mean $\overline{B}_{2,i}$ of the pixel values of all the pixels in the pixel block $B_{2,i}$. The difference indicator unit 550 may then compute the difference indicator $D_i$ by $$D_i=\text{abs}(\overline{B}_{1,i}-\overline{B}_{2,i}). \qquad \text{Function(1)}$$

In some embodiments, the mean $\overline{B}_{1,i}$ and the mean $\overline{B}_{2,i}$ may be weighted means. Different weights may be associated with pixels of different colors.

Approach c: The difference indicator unit 550 may compute a mean $\overline{C}_{1,i}$ of pixel values of pixels of a predetermined color in the pixel block $B_{1,i}$, and a mean $\overline{C}_{2,i}$ of pixel values of pixels of the same predetermined color in the pixel block $B_{2,i}$. The difference indicator unit 550 may then compute the difference indicator $D_i$ by $$D_i=\text{abs}(\overline{C}_{1,i}-\overline{C}_{2,i}). \qquad \text{Function (2)}$$

In some embodiments, the predetermined color may be green, as pixels of green color may be less affected by noise than pixels of other colors.

The difference indicator unit 550 may also adopt any other approach to compute the difference indicator $D_i$. For example, the difference indicator unit 550 may adopt an approach for performing a motion detection or motion analysis on a frame to compute the difference indicator $D_i$.

Figures 11, 12, 13, 14:
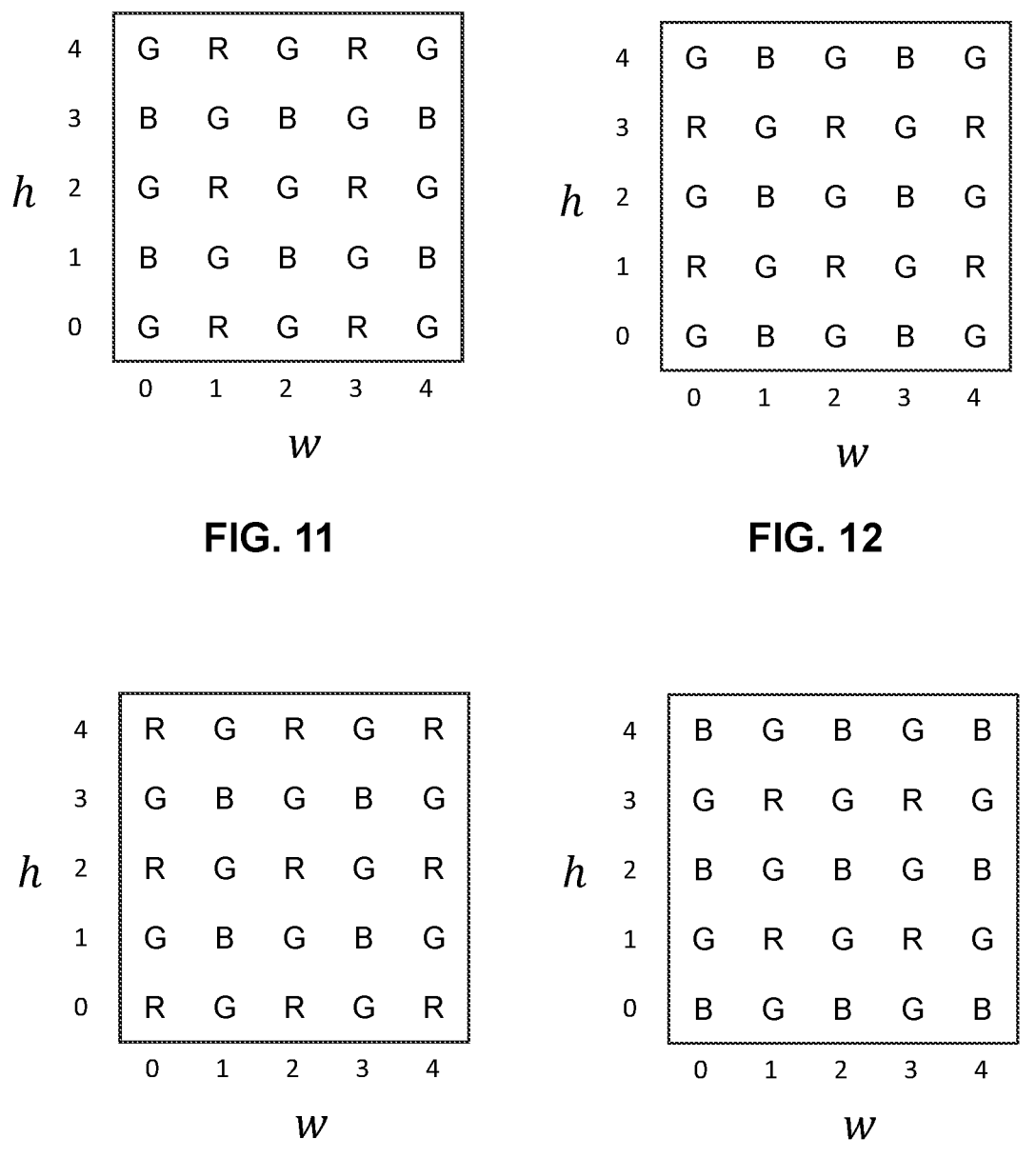

An example for computing the difference indicator $D_i$ is described in connection with FIGS. 9-11.

In 660, the pixel modification unit 560 may compute an output value $O_i$ to modify a pixel $P_{1,i}$ (e.g., first pixel of interest) in the pixel block $B_{1,i}$. For example, the pixel modification unit 560 may replace the pixel value $V_{1,i}$ of the pixel $P_{1,i}$ with the output value $O_i$ or adjust the pixel value $V_{1,i}$ towards the output value $O_i$. The pixel $P_{1,i}$ may be a pixel at or near (e.g., 1~2 pixels away) the center of the window region $W_i$. It is noted that, the pixel $P_{1,i}$ may also be any other pixel in the window region $W_i$.

In some embodiments, the pixel modification unit 560 may compute the output value $O_i$ based at least on the difference indicator $D_i$, the pixel value $V_{1,i}$, and the pixel value $V_{2,i}$ of a pixel $P_{2,i}$ in the pixel block $B_{2,i}$ which corresponds to the pixel $P_{1,i}$. In some embodiments, the pixel modification unit 560 may compute the output value $O_i$ using an image processing model associated with the kth iteration. For example, the pixel modification unit 560 may compute the output value $O_i$ via a model for reducing noise, so as to reduce noise in the first image. As another example, the pixel modification unit 560 may compute the output value $O_i$ via a combined model including a model for reducing noise and a model for correcting color (e.g., by successively performing the model for reducing noise and the model for correcting color during the computing of the output value OA so as to reduce noise and correct color in the first image simultaneously.

In some embodiments, the pixel modification unit 560 may obtain weights associated with the pixel $P_{1,i}$ and the pixel $P_{2,i}$ based on at least the difference indicator $D_i$. The pixel modification unit 560 may then compute the output value $O_i$ using the obtained weights.

In some embodiments, the pixel modification unit 560 may compute a weighted sum or a weighted mean of the pixel values $V_{1,i}$ and $V_{2,i}$ as the output value $O_i$.

In some embodiments, the pixel modification unit 560 may compute the output value $O_i$ using the weights via a process as described in connection with FIG. 8.

In some embodiments, the pixel modification unit 560 may compute the output value $O_i$ based on a brightness indicator indicating a brightness of the pixel block $B_{1,i}$. For example, the pixel modification unit 560 may use the brightness indicator to determine the weights associated with the pixel $P_{1,i}$ and the pixel $P_{2,i}$.

In some embodiments, the aforementioned $\overline{B}_{1,i}$ (weighted or not weighted) or $\overline{C}_{1,i}$ may serve as the brightness indicator or serve as a basis for the pixel modification unit 560 to compute the brightness indicator.

In some embodiments, the pixel modification unit 560 may compute the output value $O_i$ based on a reference parameter associated with the pixel block $B_{2,i}$. For example, the pixel modification unit 560 may use the reference parameter to determine the weights associated with the pixel $P_{1,i}$ and the pixel $P_{2,i}$.

In some embodiments, the reference parameter may be a difference indicator obtained during the processing of the second image based on another image via the process 400 (with the process 600 to achieve the operation 430). For example, the first image may be the fth (f≥3) frame of a video, and the second image may be the f−1th frame of the video. The second image may be obtained by processing its original version (i.e., unprocessed version) based on the f−2th frame (processed or unprocessed) of the video according to the process 400. The processes, corresponding models, and corresponding parameters for processing the f−1th frame and the fth frame may be identical. In processing the second image, a difference indicator $D'_i$ may be obtained by the difference indicator unit 500 to modify the pixel $P_2$ in the second image. The difference indicator unit 550 may store the difference indicator $D'_i$ in a storage device (e.g., the RAM 240, the storage device 220) as a reference parameter associated with the pixel $P_{2,i}$. When processing the first image, the pixel modification unit 560 may use the difference indicator $D'_i$ as the reference parameter for modifying the pixel $P_{1,i}$ in the first image.

In 670, the first detection unit 570 may detect whether the processing of the image processing region $R_k$ is completed. Upon a detection that the processing of the image processing region $R_k$ is not completed, the first detection unit 570 may trigger the operation 620 again to modify another pixel ($P_{1,i+1}$). Upon a detection that the processing of the image processing region $R_k$ is completed, the first detection unit 570 may end the kth iteration, and trigger operation 680.

For example, to detect whether the processing of the image processing region $R_k$ is completed, the first detection unit 570 may detect whether the window region $W_i$ is the last window region of all the window regions set by the window region unit 520 in the kth iteration. Upon a detection that the window region $W_i$ is not the last window region, the first detection unit 570 may trigger the operation 620 again, and a window region $W_{i+1}$ may be set by the window region unit 520 by moving the sliding window to the next position (i+1th position) to modify another pixel $P_{1,i+1}$ in the window region $W_{i+1}$. The window region $W_{i+1}$ and the window region $W_i$ may be overlapped, and the modified $P_1$ may be used to modify $P_{1,i+1}$.

The window region unit 520 may move (or run) the sliding window according to a predetermined pattern. For example, the window region unit 520 may move the sliding window along one or more predetermined trajectories. In some embodiments, the one or more predetermined trajectory may be parallel with the edge of the image processing region $R_k$. In some embodiments, the window region unit 520 may move the sliding window along each of the one or more predetermined trajectories with a stride of 1 pixel, and all the pixels modified by repeating the operations 620 to 670 may form a continuous processed region. In each iteration of the K iterations, the size of the processed region may be smaller than the corresponding image processing region.

In 680, the second detection unit 580 may detect whether the processing of the tile is completed. Upon a detection that the processing of the tile is not completed, the second detection unit 580 may trigger the operation 610 again to start the k+1th iteration. Upon a detection that the processing of the tile is completed, the second detection unit 580 may end the process 600.

In some embodiments, K may be a predetermined number such as 2, 3, 4, etc. To detect whether the processing of the tile is completed, the second detection unit 580 may detect whether the kth iteration is the Kth iteration. Upon a detection that the current k is less than K, the second detection unit 580 may end the process 600. Otherwise the second detection unit 580 may trigger the operation 610 again.

In some embodiments, K may depend on the performance or the result of the image processing operation. To detect whether the processing of the tile is completed, the second detection unit 580 may detect whether a termination condition for terminating the processing of the tile is satisfied. For example, the second detection unit 580 may detect that whether the size of the processed region or the size of the image processing region $R_k$ is less than or equal to a threshold $T_{size}$. Upon a detection that size of the processed region or the size of the image processing region $R_k$ is less than or equal to the threshold $T_{size}$, the second detection unit 580 may end the process 600. Otherwise the second detection unit may trigger the operation 610 again. As another example, the second detection unit 580 may detect that whether a difference of the processed region before and after the kth iteration is less than or equal to a threshold $T_{dif}$ (i.e., whether a convergence is achieved). For example, the second detection unit 580 may determine the difference via an approach similar to the approach a, b, or c as described above. Upon a detection that the difference is less than or equal to the threshold $T_{dif}$, the second detection unit may end the process 600. Otherwise the second detection unit 580 may trigger the operation 610 again.

In some embodiments, when the operation 610 is re-triggered, the image processing region unit 510 may decrease the size of the image processing region $R_{k+1}$ by setting the processed region of the k iteration to be the image processing region $R_{k+1}$ of the k+1th iteration. For example, if a 9×9 processed region is obtained by processing a 13×13 image processing region after an iteration, the image processing region unit 510 may set the 9×9 processed region as the image processing region for the next iteration.

In some embodiments, when the operation 610 is re-triggered, the image processing region unit 510 may set the image processing region $R_{k+1}$ based on the processed region of the k iteration. For example, if an MxM processed region is obtained after an iteration (M is a positive integer), the image processing unit 510 may set an (M+2)×(M+2) region having a center at the center of the MxM processed region as the image processing region for the next iteration.

In some embodiments, when the operation 610 is re-triggered, the image processing region unit 510 may set the processed region $R_{k+1}$ regardless the processed region of the kth iteration. For example, if a 9×9 processed region is obtained by processing a 13×13 image processing region after an iteration, the image processing region unit 510 may set an nxn region in the 13×13 image processing region as the image processing region of the next iteration, wherein n is an arbitrary positive integer that is smaller than 13. As another example, the image processing region unit 510 may set an mxm region in the 9×9 processed region as the image processing region of the next iteration, wherein m is an arbitrary positive integer that is smaller than or equal to 9. In some embodiments, the image processing region unit 510 may reduce the height and/or width of the image processing region arithmetically with a predetermined common difference (e.g., 2, 4, 6). The reductions on height and width of the image processing region may be the same or different.

By repeating the process 600, the processing module 500 may process each of the one or more tiles determined in the operation 420.

In some embodiments, the process 600 may be performed to process a greyscale image. The processing of a greyscale image may be the same as or similar to the processing of an image formatted according to a color filter array.

In some embodiments, the process 600 may be performed to process a full color image. A full color image may be considered as formed by a plurality of sub-images, each of which corresponds to a color channel of the color space of the full color image. For example, for an RGB image, each pixel may have three pixel values, corresponding to the R, G, and B channels, respectively. An RGB image may then be considered as formed by three sub-images, made up of the pixel values of the corresponding color channel (R, G, or B). Then the process 600 may be performed to process each of the plurality of sub-images of the full color image respectively.

In some embodiments, the processing module 500 may perform the process 600 on each of the plurality of sub-images of the full color image based further on one or more other sub-images of the full color image (e.g., for computing the difference indicator or computing the output value).

It should be noted that the above descriptions of the process 600 are only for demonstration purposes, and not intended to limit the scope of the present disclosure. It is understandable that, after learning the major concept of the present disclosure, a person of ordinary skills in the art may alter the process 600 in an uncreative manner. For example, the operations above may be implemented in an order different from that illustrated in FIG. 6. One or more optional operations may be added to the flowcharts. One or more operations may be split or be combined. All such modifications are within the scope of the present disclosure.

Figure 7:
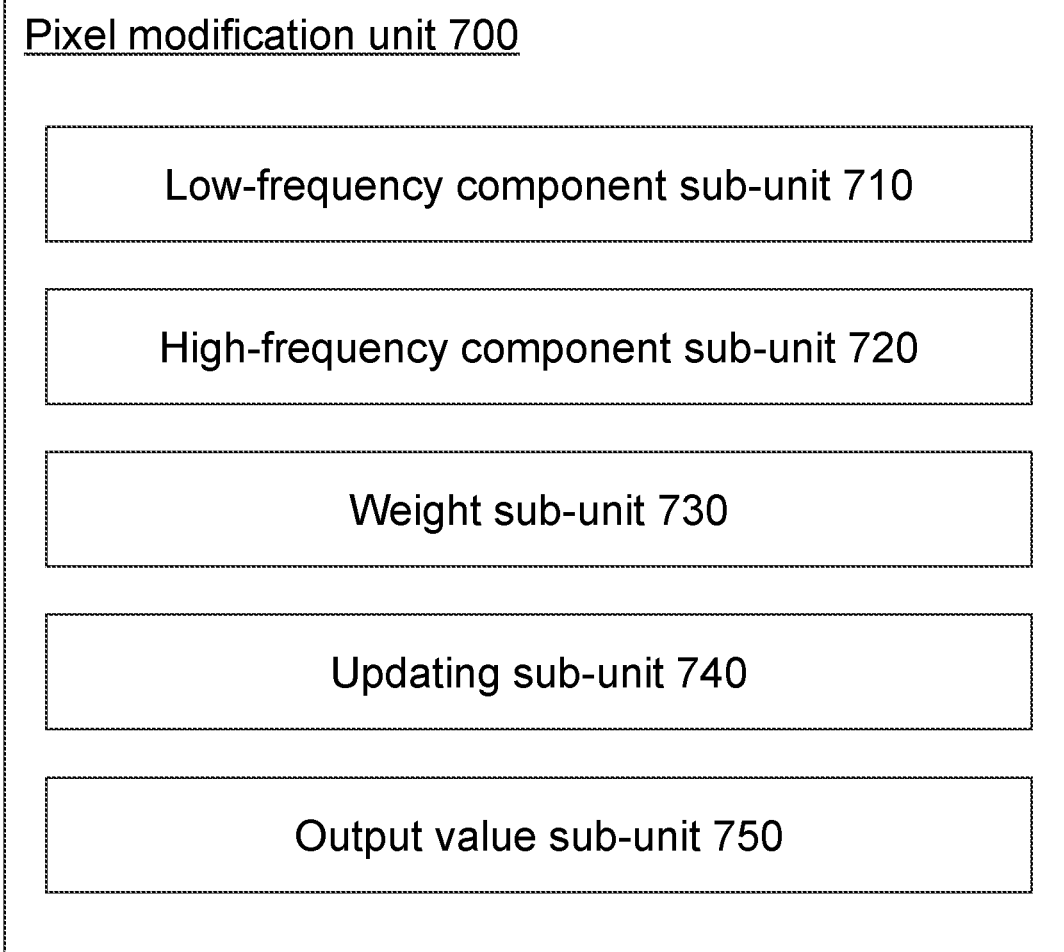
FIG. 7 is a schematic diagram illustrating an exemplary pixel modification unit according to some embodiments of the present disclosure.

FIG. 7 is a schematic diagram illustrating an exemplary pixel modification unit 700 according to some embodiments of the present disclosure. In some embodiments, the pixel modification unit 700 may be an example of the pixel modification unit 560. The pixel modification unit 700 may be implemented by the image processing circuit 114 or the console 120 to modify a pixel via a process illustrated in FIG. 8 or an embodiment thereof. The pixel modification unit 700 may include a low-frequency component sub-unit 710, a high-frequency component sub-unit 720, a weight sub-unit 730, an updating sub-unit 740, and an output value sub-unit 750.

The low-frequency component sub-unit 710 may be configured to obtain low-frequency components of a first pixel of interest and a second pixel of interest (such as the pixel $P_{1,i}$ and the pixel $P_{2,i}$ in the process 600).

The high-frequency component sub-unit 710 may be configured to obtain high-frequency components of the first pixel of interest and the second pixel of interest.

The weight sub-unit 720 may be configured to obtain weights associated with the first pixel of interest and the second pixel of interest.

The updating sub-unit 730 may be configured to compute an updated high-frequency component for the first pixel of interest based on the high-frequency components of the first pixel of interest and the second pixel of interest and the weights associated with the first pixel of interest and the second pixel of interest.

The output value sub-unit 740 may be configured to compute an output value to modify the first pixel of interest based on at least the updated high-frequency component of the first pixel of interest and the low-frequency component of the first pixel of interest.

The sub-units of the pixel modification unit 700 and their functions may be further described in connection with FIG. 8.

FIG. 8 is a flowchart illustrating an exemplary process 800 for modifying a pixel of interest in a pixel block according to some embodiments of the present disclosure. The process 800 is a process for reducing noise in the first image, and may be performed by the pixel modification unit 700 to achieve the operation 660 illustrated in FIG. 6. In some embodiments, the process 800 may also be combined with a process of another type of image processing (e.g., color correction, blur reduction) to achieve the operation 660.

In some embodiments, one or more operations of process 800 illustrated in FIG. 8 may be implemented in the image processing system 100 illustrated in FIG. 1. For example, the process 800 illustrated in FIG. 8 may be stored in a storage device (e.g., the RAM 240, the storage device 220) in the form of instructions, and invoked and/or executed by one or more processors (e.g., the processor 210, the image processing circuit 114) implementing the pixel modification unit 700 illustrated in FIG. 7.

The process 800 may be described in connection with the process 600 illustrated in FIG. 6. Same parameters may hold the same meaning in the process 800 and the process 600.

In 810, the low-frequency component sub-unit 710 may obtain a low-frequency component $V_{1,i\_l}$ of the pixel $P_{1,i}$ and a low-frequency component $V_{2,i\_l}$ of the pixel $P_{2,i}$.

Exemplary approaches for obtaining the low-frequency components $V_{1,i\_l}$ and the $V_{2,i\_l}$ are provided as following, which are only for demonstration purposes and not intended to be limiting.

In some embodiments, the low-frequency component $V_{1,i\_l}$ or $V_{2,i\_l}$ may be the component whose frequency is below a predetermined cut-off frequency. For illustration purpose, an operation for generating a low-frequency image $I_{1\_l}$ based on the first image and a low-frequency image $I_{2\_l}$ based on the second image is described. To generate the low-frequency image $I_{1\_l}$, a low-frequency image module may perform a Fourier transformation on the first image to generate a transformed image $F_1$, select an image part $F_{1\_l}$ of the transformed image $F_1$ that represents components of pixel values whose frequency is below the cut-off frequency, and perform a reverse-Fourier transformation on the image part $F_{1\_l}$ to generate the low-frequency image $I_{1\_l}$. Similarly, the low-frequency image module may generate a low-frequency image $I_{2\_l}$ of the second image. Then the low-frequency component sub-unit 710 may obtain the pixel value of the corresponding pixel in the low-frequency image $I_{1\_l}$ as the low-frequency component $V_{1,i\_l}$ and the pixel value of the corresponding pixel in the low-frequency image $I_{2\_l}$ as the low-frequency component $V_{2,i\_l}$.

In some embodiments, the low-frequency component sub-unit 710 may use a mean of pixel values of all the pixels in the pixel block $B_{1,i}$ (i.e., the aforementioned $\overline{B}_{1,i}$) as the low-frequency components $V_{1,i\_l}$, and a mean of pixel values of all the pixels in the pixel block $B_{2,i}$ (i.e., the aforementioned $\overline{B}_{2,i}$) as the low-frequency component $V_{2,i\_l}$. For example, the low-frequency components $V_{1,i\_l}$ and $V_{2,i\_l}$ may be computed and stored by the difference indicator unit 550 for determining the difference indicator $D_i$ in the operation 650 (e.g., via the approach b or c). The low-frequency component sub-unit 710 may retrieve the stored $V_{1,i\_l}$ and $V_{2,i\_l}$ in 810 for determining the output value $O_i$ in the subsequent operations.

In some embodiments, the low-frequency component sub-unit 710 may compute a mean of pixel values of pixels having the color of the pixel $P_{1,i}$ in the pixel block $B_{1,i}$ as the low-frequency components $V_{1,i\_l}$, and a mean of pixel values of pixels having the same color in the pixel block $B_{2,i}$ as the low-frequency component $V_{2,i\_l}$.

In some embodiments, the low-frequency component sub-unit 710 may obtain the low-frequency components $V_{1,i\_l}$ of the pixel $P_1$, via an aforementioned approach, and use the low-frequency components $V_{1,i\_l}$ as the low-frequency component of the pixel $P_{2,i}$. The computing of the low-frequency component $V_{2,i\_l}$ may be omitted.

In some embodiments, the operation 810 may be performed before the operation 650, and the difference indicator $D_i$ may be determined according to the low-frequency components $V_{1,i\_l}$ and $V_{2,i\_l}$ of the pixel $P_1$, and the pixel $P_{2,i}$. For example, the low-frequency component sub-unit 710 may obtain the low-frequency components $V_{1,i\_l}$ and $V_{2,i\_l}$ of the pixel $P_{1,i}$ and the pixel $P_{2,i}$ at first, then the difference indicator unit 550 may obtain the difference indicator $D_i$ by:

$$D_i = \text{abs}(V_{1,i\_l} - V_{2,i\_l}). \quad \text{Function (3)}$$

In 820, the high-frequency component sub-unit 720 may obtain a high-frequency component $V_{1,i\_h}$ of the pixel $P_{1,i}$ and a high-frequency component $V_{2,i\_h}$ of the pixel $P_{2,i}$. The high-frequency component sub-unit 720 may obtain the high-frequency component $V_{1,i\_h}$ based on the low frequency component $V_{1,i\_l}$ and the pixel value $V_{1,i}$, and obtain the high-frequency component $V_{2,i\_h}$ based on the low frequency component $V_{2,i}\_l$ and the pixel value $V_{2,i}$. In some embodiments, the high-frequency component sub-unit 720 may obtain the high-frequency component of a pixel by subtracting the corresponding low-frequency component of the pixel from the pixel value of the pixel. For example, the high-frequency component sub-unit 720 may obtain the high-frequency component $V_{1,i\_h}$ of the pixel $P_{1,i}$ and the high-frequency component $V_{2,i\_h}$ of the pixel $P_{2,i}$ by:

$$V_{1,i\_h} = V_{1,i} - V_{1,i\_l},  \quad \text{Function (4)}$$

$$V_{2,i\_h} = V_{2,i} - V_{2,i\_l}.  \quad \text{Function (5)}$$

In 830, the weight sub-unit 730 may obtain weights associated with the pixels $P_{1,i}$ and $P_{2,i}$ based at least on the difference indicator $D_i$. For example, the weight sub-unit 730 may be configured to compute, based on the difference indicator $D_i$, a weight $w_{1,i}$ (first weight) associated with the pixel $P_{1,i}$ and a weight $w_{1,i}$ (second weight) associated with the pixel $P_{2,i}$, satisfying that, when the difference indicator $D_i$ is within a certain value range, the higher the difference between the pixel block $B_{1,i}$ and the pixel bock $B_{2,i}$ is (i.e., what the difference indicator $D_i$ indicates), the higher the weight $w_{1,i}$ is compared to the weight $w_{2,i}$. Such a configuration may reduce possible smearing in the first image when the first image and the second image (e.g., two successive frames) are remarkably different. In some embodiments, the weights $w_{1,i}$ and $w_{2,i}$ may have predetermined values when the difference indicator $D_i$ is within one or more certain value ranges. When the difference indicator $D_i$ is within other value ranges, the weights $w_{1,i}$ and $w_{2,i}$ may be obtained by interpolation and/or extrapolation. For example, the weight sub-unit 730 may obtain the weight $w_{1,i}$ via a stepwise Function (6) and obtain the weight $w_{1,i}$ via a Function (7). The Function (6) and the Function (7) may be expressed by:

$$w_{1,i} = \begin{cases} \dfrac{coe_{1,k}}{C_k}, & D_i \le d_{1,k} \\ \dfrac{1}{C_k}\left[(coe_{2,k} - coe_{1,k}) \times \dfrac{D_i - d_{1,k}}{d_{2,k} - d_{1,k}} + coe_{1,k}\right], & d_{1,k} < D_i < d_{2,k} \\ \dfrac{coe_{2,k}}{C_k}, & d_{2,k} \le D_i \le d_{3,k}, \\ \dfrac{1}{C_k}\left[(coe_{3,k} - coe_{2,k}) \times \dfrac{D_i - d_{3,k}}{d_{4,k} - d_{3,k}} + coe_{2,k}\right], & d_{3,k} < D_i < d_{4,k} \\ \dfrac{coe_{3,k}}{C_k}, & D_i \ge d_{4,k} \end{cases} \quad \text{Function (6)}$$

$$w_{2,i} = 1 - w_{1,i}, \quad \text{Function (7)}$$

where one or more of parameters $coe_{1,k}$, $coe_{2,k}$, $coe_{3,k}$, $C_k$, $d_{1,k}$, $d_{2,k}$, $d_{3,k}$, and $d_{4,k}$ may be predetermined parameters associated with the kth iteration, or be variable parameters determined by the weight sub-unit 730 via a function or model associated with the kth iteration. The predetermined parameter(s) in the Functions (6) and (7) may remain the same or be varied in different iterations. The function or model for determining variable parameter(s) may remain the same or be varied in different iterations. In some embodiments, different iterations may be associated with different predetermined parameter(s) and/or model(s) for determining variable parameter(s) to adjust the strength of the noise reduction in each iteration.

In some embodiments, in one or more iterations of the K iterations (e.g., in each iteration, when k=1, or when k is in a range [1:3]), the weight sub-unit 730 may obtain the weights $w_{1,i}$ and $w_{2,i}$ based further on a brightness indicator $L_i$ indicating a brightness of the pixel block $B_{1,i}$. For example, in the Function (6), the parameters $coe_{1,k}$, $coe_{2,k}$, $coe_{3,k}$, and $C_k$ may be predetermined parameters (e.g., 4, 25, 60, and 64, respectively), and the weight sub-unit 730 may be configured to adjust the variable parameters $d_{1,k}$, $d_{2,k}$, $d_{3,k}$, and $d_{4,k}$ based on the brightness indicator $L_i$. Such a configuration may adjust the strength of the noise reduction to adapt to local regions of different brightness, as local regions of different brightness may have noise of different extent.

In some embodiments, the brightness indicator $L_i$ may be a mean of pixel values of all the pixels in the pixel block $B_{1,i}$ (i.e., the aforementioned $\overline{B}_{1,i}$), or a mean of pixel values of pixels of a predetermined color (e.g., green) in the pixel block $B_{1,i}$ (i.e., the aforementioned $\overline{C}_{1,i}$). In some embodiments, the brightness indicator $L_i$ may be computed and stored by the difference indicator unit 550 for determining the difference indicator $D_i$ in the operation 650 (e.g., via the approach b or c). The weight sub-unit 730 may retrieve the stored $L_i$ in 830 for determining the weights $w_{1,i}$ and $W_{2,i}$.

In some embodiments, the brightness indicator $L_i$ may be $\overline{C}_{1,i}$ computed based on green pixels in the pixel block $B_{1,i}$. For example, if $L_i$ is less than or equal to a first threshold value (e.g., 8 or any other proper value), the parameters $d_{1,k}$, $d_{2,k}$, $d_{3,k}$, and $d_{4,k}$ may have a first set of predetermined values (e.g., 0, 2, 2, and 4, respectively); if $L_i$ is greater than or equal to a second threshold value (e.g., 255 or any other proper value), the parameters $d_{1,k}$, $d_{2,k}$, $d_{3,k}$, and $d_{4,k}$ may have a second set of predetermined values (e.g., 8, 40, 40, and 72, respectively); and if $L_i$ is between the first threshold value and the second threshold value, the values of parameters $d_{1,k}$, $d_{2,k}$, $d_{3,k}$, and $d_{4,k}$ may be obtained by the weight sub-unit 730 via, e.g., a linear interpolation. For example, to obtain a variable parameter $d_{n,k}$ of the Function (6) (n is an integer between 1 and 4), the weight sub-unit 730 may use a stepwise Function (8), which may be expressed by:

$$d_{n,k} = \begin{cases} a_{n,k}, & L_i \le 8 \\ (b_{n,k} - a_{n,k}) \times \dfrac{L_i - 8}{255 - 8,} + a_{n,k}, & 8 < L_i < 255 \\ b_{n,k}, & L_i \ge 255 \end{cases}$$

where parameters $a_{n,k}$ and $b_{n,k}$ are predetermined values associated with the kth iteration, which may remain the same or be varied in different iterations. The value ranges of each part of the Function (8) may be set according to actual needs.

The first set of predetermined values and/or the second set of predetermined values may remain the same or be varied in different iterations.

In some embodiments, in one or more iteration of the K iterations (e.g., in each iteration, or when k=K), the weight sub-unit 730 may obtain the weights $w_{1,i}$ and $w_{2,i}$ based further on a reference parameter associated with the pixel $P_{2,i}$. For example, the first image and the second image may be successive frames of a video, and the second image may be obtained by processing its original version (i.e., unprocessed version) based on its preceding frame via the process 400. The reference parameter may be a difference indicator $D'_i$ obtained by the difference indicator unit 550 for modifying the pixel $P_{2,i}$ in the second image. The difference indicator unit 550 may store the difference indicator $D'_i$ in a storage device (e.g., the RAM 240, the storage device 220) as the reference parameter associated with the pixel $P_{2,i}$. Then the weight sub-unit 730 may be configured to retrieve the difference indicator $D'_i$ from the storage device, and compute the weights $w_{1,i}$ and $w_{2,i}$ based on the difference indicator $D_i$. When the difference indicator $D'_i$ is above a threshold, a ratio of the weight $w_{1,i}$ to the weight $w_{2,i}$ may be increased. Such a configuration may reduce possible smearing in the first image when the second image and its preceding frame are remarkably different.

In some embodiments, the weight sub-unit 730 may be configured to obtain one or more parameters of the Function (6) based on the difference indicator $D'_i$. For example, the weight sub-unit 730 may determine the parameters $coe_{1,k}$, $coe_{2,k}$, and $coe_{3,k}$ based on the difference indicator $D'_i$ and a threshold T. When $D'_i > T$, the parameters $coe_{1,k}$, $coe_{2,k}$, and $coe_{3,k}$ may have a first set of values (e.g., 40, 50, and 64, respectively); otherwise, the parameters $coe_{1,k}$, $coe_{2,k}$, and $coe_{3,k}$ may have a second set of values (e.g., 10, 35, and 64, respectively).

In some embodiments, the threshold T may be a predetermined value (e.g., 20, 30, 40). When multiple iterations of the K iterations use a reference parameter for determining the weights, the threshold T may be fixed or be varied for different iterations.

In some embodiments, the weight sub-unit 730 may determine the threshold T based on the brightness indicator $L_i$ to adapt to local regions of different brightness. For example, if $L_i$ is less than or equal to a first threshold value (e.g., 8 or any other proper value), the threshold T may have a first value (e.g., 4); if $L_i$ is greater than or equal to a second threshold value (e.g., 255 or any other proper value), the threshold T may have a second value (e.g., 40); and if $L_i$ is between the first threshold value and the second threshold value, the value of the threshold T may be obtained by the weight sub-unit 730 via, e.g., linear interpolation (e.g., similar to the Function (8)). When multiple iterations of the K iterations use a reference parameter for determining the weights, the first value and the second value of the threshold T may be fixed or be varied for different iterations.

In 840, the updating sub-unit 740 may compute an updated high-frequency component $V'_{1,i\_h}$ for the pixel $P_{1,i}$ based on the high-frequency components $V_{1,i\_h}$, $V_{2,i\_h}$, and the weights associated with the pixels $P_1$ and $P_{2,i}$. The updating sub-unit 740 may compute a weighted sum of the high-frequency components $V_{1,i\_h}$ and $V_{2,i\_h}$ as the updated high-frequency component $V'_{1,i\_h}$ when the sum of the weights is equal to 1. Alternatively, the updating sub-unit 740 may compute a weighted mean of the high-frequency components $V_{1,i\_h}$ and $V_{2,i\_h}$ as the updated high-frequency component $V_{1,i\_h}u$ when the sum of the weights is not equal to 1.

For example, via the Function (6) and the Function (7), the weight sub-unit 730 may obtain the weights $w_{1,i}$ and $w_{2,i}$ associated with the pixels $P_{1,i}$ and $P_{2,i}$. As $w_{1,i} + w_{2,i} = 1$, the updating sub-unit 740 may compute the updated high-frequency component $V'_{1,i\_h}$ via the Function (9), which may be expressed as:

$$V'_{1,i_h} = w_{1,i} V_{1,i\_h} + w_{2,i} V_{2,i\_h}. \quad \text{Function (9)}$$

In 850, the output value sub-unit 750 may compute the output value $O_i$ to, e.g., replace the value $V_{1,i}$ of the pixel $P_{1,i}$. The output value sub-unit 750 may compute the output value $O_i$ by adding the updated high-frequency component $V_{1,i\_h}$ and the low-frequency component $V_{1,i\_l}$ of the pixel $P_{1,i}$. For example, the output value sub-unit 750 may compute the output value $O_i$ via a Function (10), which may be expressed as:

$$O_i = V'_{1,i\_h} + V_{1,i\_l}. \quad \text{Function (10)}$$

As the high-frequency component of the pixel value may be more affected by noise, by modifying the high-frequency component of the pixel value of the pixel $P_{1,i}$ and retaining its low-frequency component, the noise reduction effect may be further enhanced.

It should be noted that the above descriptions of the process 800 are only for demonstration purposes, and not intended to limit the scope of the present disclosure. It is understandable that, after learning the major concept of the present disclosure, a person of ordinary skills in the art may alter the process 800 in an uncreative manner. For example, the operations above may be implemented in an order different from that illustrated in FIG. 8. One or more optional operations may be added to the flowcharts. One or more operations may be split or be combined. All such modifications are within the scope of the present disclosure.

In some embodiments, the operations 830 and 840 may be combined as a single operation. The weight sub-unit 730 may be removed or be integrated into the updating sub-unit 740. The Functions (6), (7), and (9) may be combined as a composed function which may directly output the updated high frequency component $V'_{1,i\_h}$ of the pixel $P_{1,i}$ without performing the obtaining the weights associated with the pixels $P_{1,i}$ and $P_{2,i}$ separately. For example, the composed function may be expressed as a combination of Functions (11) to (14) as following:

$$V'_{i,i_h} = \begin{cases} v_{1,k}, & D_i \leq d_{1,k} \\ \left[(v_{2,k} - v_{1,k}) \times \dfrac{D_i - d_{1,k}}{d_{2,k} - d_{1,k}} + v_{1,k}\right], & d_{1,k} < D_i < d_{2,k} \\ v_{2,k}, & d_{2,k} \leq D_i \leq d_{3,k}, \\ \left[(v_{3,k} - v_{2,k}) \times \dfrac{D_i - d_{3,k}}{d_{4,k} - d_{3,k}} + v_{2,k}\right], & d_{3,k} < D_i < d_{4,k} \\ v_{3,k}, & D_i \leq d_{4,k} \end{cases} \quad \text{Function (11)}$$

$$v_{1,k} = [coe_{1,k} \times V_{1,i\_h} + (C_k - coe_{1,k}) \times V_{2,i\_h}]/C_k, \quad \text{Function (12)}$$

$$v_{2,k} = [coe_{2,k} \times V_{1,i\_h} + (C_k - coe_{2,k}) \times V_{2,i\_h}]/C_k, \quad \text{Function (13)}$$

$$v_{3,k} = [coe_{3,k} \times V_{1,i\_h} + (C_k - coe_{3,k}) \times V_{2,i\_h}]/C_k, \quad \text{Function (14)}$$

Figure 9:
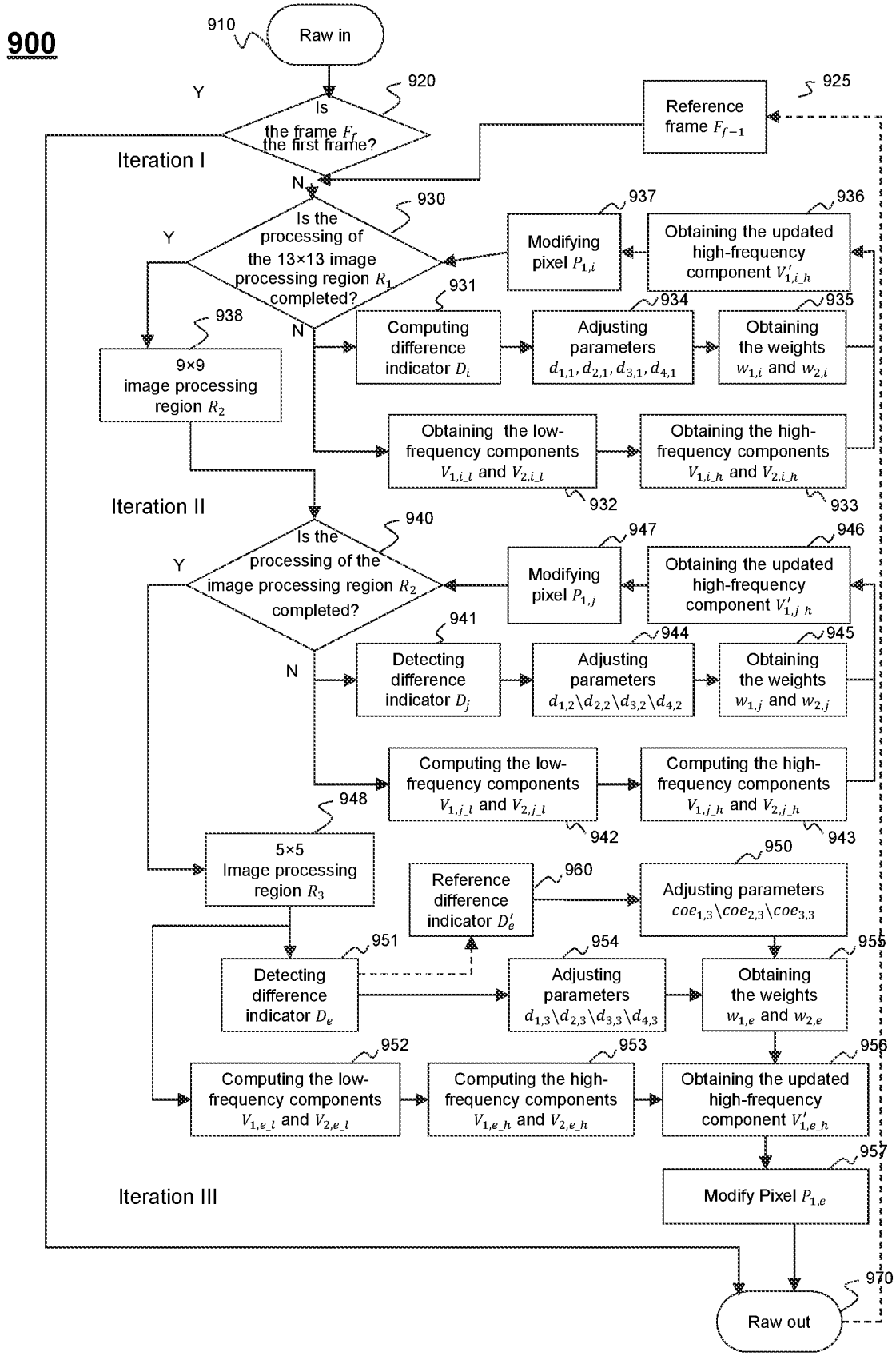
FIG. 9 is a flowchart illustrating an exemplary process for processing the and a raw digital video stream generated by an image sensor covered by a Bayer filter according to some embodiments of the present disclosure.
Figure 10:
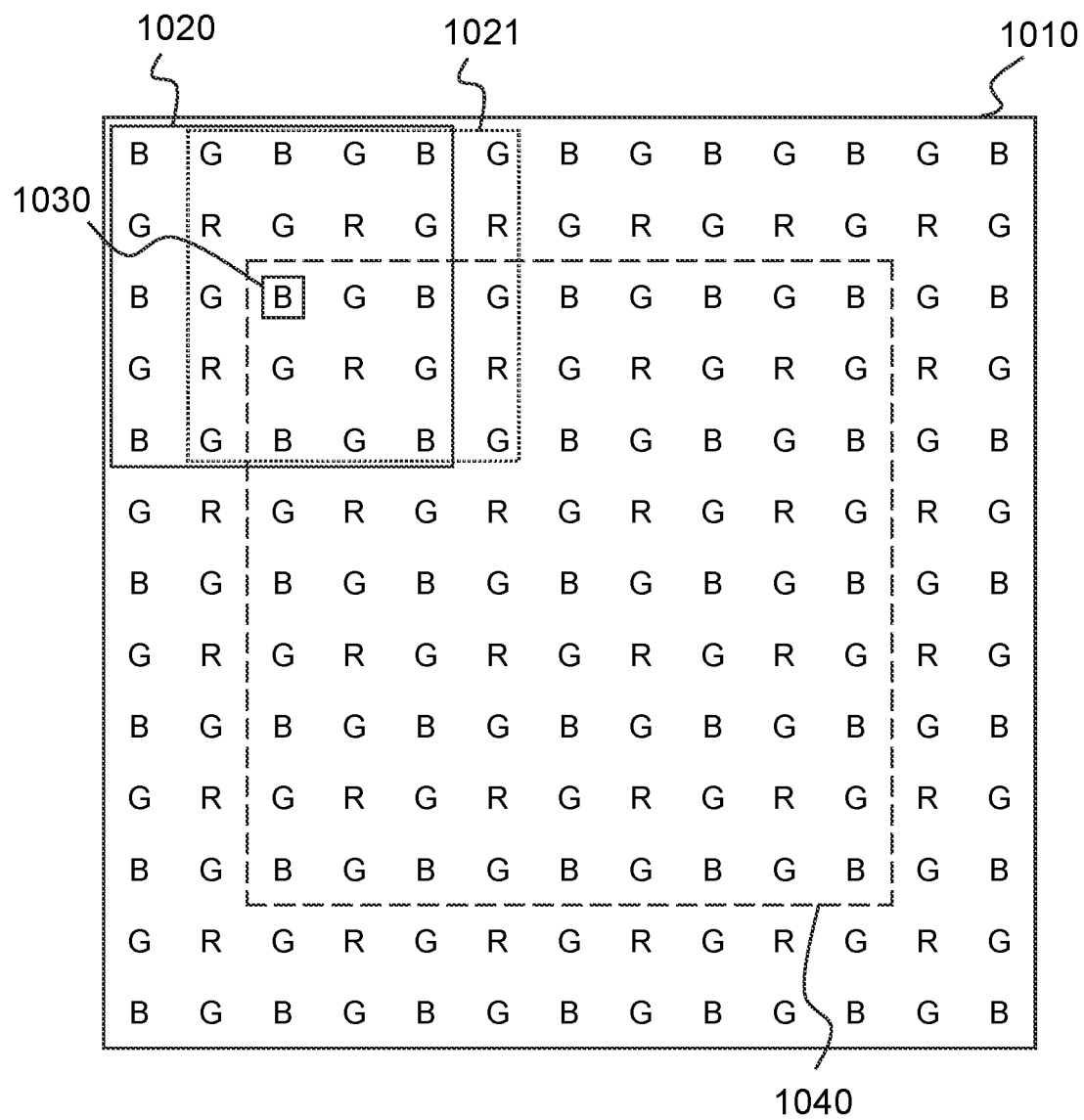
Figure 15:
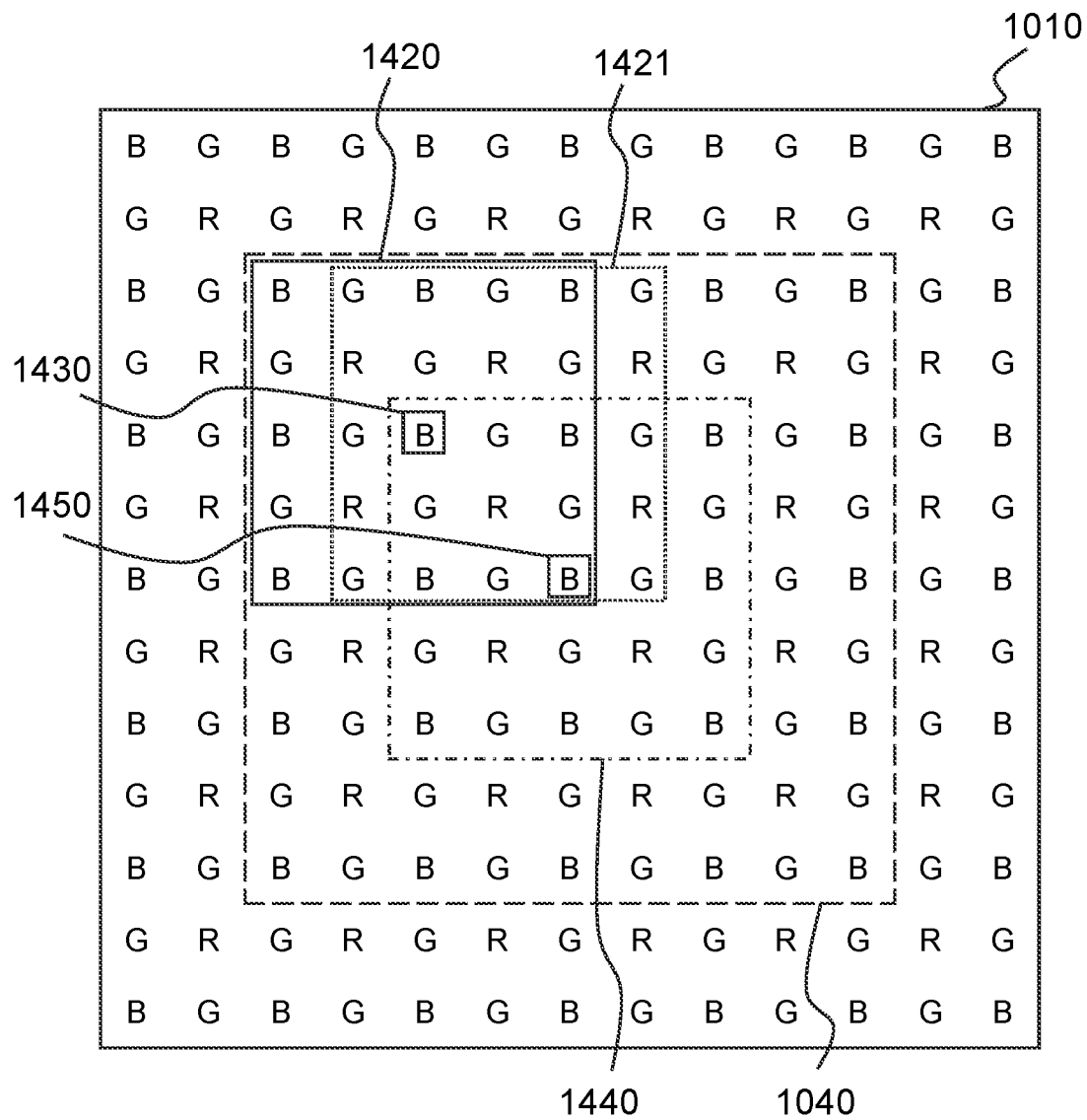

FIG. 9 is a flowchart illustrating an exemplary process 900 for processing a raw digital video stream generated by an image sensor covered by a Bayer filter according to some embodiments of the present disclosure. In some embodiments, the process 600 illustrated in FIG. 6 (with the process 800 to achieve the operation 660) may be in connection with the process 900 illustrated in FIG. 9. The process 900 may be performed by the image processing module 500 (e.g., implemented by the image processing circuit 114 of the camera 110) to reduce noise in a tile of a frame of the raw digital video stream.

The process 900 may be described in connection with FIGS. 10 to 16. FIGS. 10 to 15 are schematic diagram illustrating the process illustrated in FIG. 9 according to some embodiments of the present disclosure.

In some embodiments, the processing module 500 may be implemented by a plurality of processing cores. The plurality of processing cores may perform the process 900 in parallel to process a corresponding number of tiles simultaneously. In such embodiments the tiles of the first image may be non-overlapped.

The process 900 may include three iterations (K=3) for processing a 13×13 tile (e.g., tile 1010 in FIG. 10) in the first image. For demonstration purposes, the process 900 may be described in connection with FIGS. 10 to 15.

In 910, the image processing region unit 510 may read image data of the 13×13 tile to be processed in an fth frame $F_f$ of the raw digital video stream, where f may be a positive integer above 0. The frame $F_f$ may be a Bayer image. The image module 310 may retrieve the image data from, for example, the image sensor circuit 113, the output circuit 115, the network 130, the ram 240, or the storage device 220, etc.

In 920, the image module 310 may detect whether the frame $F_f$ is the first frame $F_1$ (i.e., whether f=1). Upon a detection that the frame $F_f$ is the first frame $F_1$, the image module 310 may trigger operation 970 to output the image data without processing and store the image data in a storage device 925, (e.g., the RAM 240, the storage device 220, a cache of the processor 210). The stored image data of all the tiles may form the complete frame $F_1$. Upon a detection that the frame $F_f$ is not the first frame $F_1$, the image module 310 may retrieve image data of the frame $F_{f-1}$ (second image) corresponding to the tile to be processed from the storage device 925, and trigger operation 930 to initiate a processing of the tile for the first iteration (Iteration I). The image processing region unit 510 may set the whole 13×13 tile as the image processing region $R_1$ in the Iteration I.

In 930, the first detection unit 570 may detect whether the processing of the image processing region $R_1$ is completed. Upon a detection that the processing of the image processing region $R_1$ is completed, the first detection unit 570 may cause the operation 938 to be triggered to initiate a processing of the tile for the second iteration (Iteration II). Upon a detection that the processing of the image processing region $R_1$ is not completed, the first detection unit 570 may cause the window region unit 520 to set a window region $W_i$ by running a 5×5 sliding window, as illustrated in FIG. 10. i may be a positive integer between 1 and the total number of window regions to be set in the Iteration I.

For example, at the first time to set a window region $W_i$, in the Iteration I, the window region unit 520 may set a window region $W_1$ (e.g., window region 1020 in FIG. 14) within the image processing region $R_1$. The window region $W_1$ may correspond to the initial position of the 5×5 sliding window in the Iteration I. Then at the next time to set a window region, the window region unit 520 may move the sliding window to its second position, and set a window region $W_2$ (e.g., window region 1021 in FIG. 10) corresponding to the second position of the sliding window, and so on.

After the window region $W_i$ is set, the first pixel block unit 530 may read image data of a pixel block $B_{1,i}$ covered by the window region $W_i$ in the first image, and the second pixel block unit 540 may read image data of a pixel block $B_{2,i}$ in the second image corresponding to the pixel block $B_{1,i}$. The pixel block $B_{1,i}$ may have a center pixel $P_{1,i}$ (e.g., the pixel 1030 for the window region 1020) and the pixel block $B_{2,i}$ may have a center pixel $P_{2,i}$ corresponding to the pixel $P_{1,i}$. The pixel $P_{1,i}$ may be the pixel to be modified in the window region $W_i$.

In 931, the difference indicator unit 550 may compute a difference indicator $D_i$ indicating a difference between the pixel block $B_{1,i}$ and the pixel block $B_{2,i}$. The difference indicator unit 550 may compute the difference indicator $D_i$ based on green pixels in the pixel block $B_{1,i}$ and the pixel block $B_{2,i}$ by:

$$D_i = \text{abs}(\overline{G}_{1,i} - \overline{G}_{2,i}), \qquad \text{Function (15)}$$

where $\overline{G}_{1,i}$ is the mean of pixel values of the green pixels in the pixel block $B_{1,i}$, and $\overline{G}_{2,i}$ is the mean of pixel values of the green pixels in the pixel block $B_{2,i}$.

As different pixel blocks may have different configurations of color array, different functions may be adopted for computing the mean $\overline{G}$ of pixel values of the green pixels (e.g., $\overline{G}_{1,i}$ and $\overline{G}_{2,i}$). FIGS. 11 to 14 illustrate Cartesian coordinate systems for describing positions of pixels in 5×5 pixel blocks having center pixels of different colors. As illustrated in FIGS. 11 and 12, for a pixel block having a green center pixel P(2,2), a green pixel in such a pixel block may satisfy that (w+h) % 2=0 (i.e., the sum of w and h is an integral multiple of 2), where w and h are integers representing the coordinates of the pixel in the Cartesian coordinate system with respect to the pixel block. The difference indicator unit 550 may compute the mean G of pixel values of green pixels in the pixel block by:

$$\overline{G} = 1/13 \Sigma V_{w,h}, \; (w+h) \% 2=0, \qquad \text{Function (16)}$$

where, $V_{w,h}$ is the pixel value of a pixel having a coordinate (w, h). Also, as illustrated in FIGS. 13 and 14, for a pixel block having a red/blue center pixel P(2,2), a green pixel in such a pixel block may satisfy that (w+h) % 2=1 (i.e., the sum of w and h is not an integral multiple of 2). The difference indicator unit 550 may compute the mean G of pixel values of green pixels in the pixel block by:

$$\overline{G} = 1/12 \Sigma V_{w,h}, \; (w+h) \% 2=0, \qquad \text{Function (17)}$$

Referring back to FIG. 9, in 932, the low-frequency component sub-unit 710 may obtain the low-frequency component $V_{1,i\_l}$ of the pixel $P_{1,i}$ and the low-frequency component $V_{2,i\_l}$ of the pixel $P_{2,i}$. The low-frequency component sub-unit 710 may compute a mean $\overline{X}_{1,i}$ of pixel values of pixels having the color of the pixel $P_{1,i}$ in the pixel block $B_{1,i}$ as the low-frequency components $V_{1,i\_l}$, and a mean $\overline{X}_{2,i}$ of pixel values of pixels having the same color in the pixel block $B_{2,i}$ as the low-frequency component $V_{2,i\_l}$. In some embodiments, the low-frequency component sub-unit 710 may only compute $\overline{X}_{1,i}$, and use the $\overline{X}_{1,i}$ as both the low-frequency components $V_{1,i\_l}$ and $V_{2,i\_l}$.

As different pixel blocks may have different configurations of color array, different functions may be adopted for computing a mean $\overline{X}$ of pixel values of the pixels (e.g., $\overline{X}_{1,i}$ and $\overline{X}_{2,i}$) having the color of the center pixel (e.g., $P_{1,i}$, $P_{2,i}$). As illustrated in FIGS. 13 and 14, for a pixel block having a red/blue center pixel P(2,2), a red/blue pixel in such a pixel block may satisfy that w % 2=0 and h % 2=0 (i.e., both of w and h are integral multiple of 2), where w and h are integers representing the coordinates of the pixel in the Cartesian coordinate system with respect to the pixel block. The low-frequency component sub-unit 710 may compute the mean $\overline{X}$ by:

$$\overline{X} = 1/9 \Sigma V_{w,h}, \; (w \% 2=0, h \% 2=0), \qquad \text{Function (18)}$$

where, $V_{w,h}$ is the pixel value of a pixel having a coordinate (w, h). Also, as illustrated in FIGS. 11 and 12, for a pixel block having a green center pixel P(2,2), a green pixel in such a pixel block may satisfy that (w+h) % 2=0. The low-frequency component sub-unit 710 may compute the mean $\overline{X}$ by:

$$\overline{X}=\tfrac{1}{13}\Sigma V_{w,h},\ (w+h)\ \%\ 2=0, \qquad \text{Function (19)}$$

The Function (19) is similar to the Function (16). In some embodiments, when the pixels $P_{1,i}$ and $P_{2,i}$ are green pixels, the low-frequency component sub-unit 710 may retrieve $\overline{G}_{1,i}$ and $\overline{G}_{2,i}$ computed in the operation 931 as the low-frequency components $V_{1,i\_l}$ and $V_{2,i\_l}$, respectively.

In 933, the high-frequency component sub-unit 720 may obtain the high-frequency component $V_{1,i\_h}$ of the pixel $P_{1,i}$ and the high-frequency component $V_{2,i\_h}$ of the pixel $P_{2,i}$. The high-frequency component sub-unit 720 may obtain the high-frequency components $V_{1,i\_h}$ and $V_{2,i\_h}$ using the Functions (4) and (5).

In 934, the weight sub-unit 730 may adjust parameters $d_{1,1}$, $d_{2,1}$, $d_{3,1}$, and $d_{4,1}$ of the Function (6) using the Function (8) (k=1). The weight sub-unit 730 may retrieve the mean $\overline{G}_{1,i}$ obtained in the operation 931 or the low-frequency component $V_{1,i\_l}$ as the brightness indicator $L_i$ to be used in the Function (8). In the Iteration I, the predetermined values $a_{n,1}$s of the parameters $d_{1,1}$, $d_{2,1}$, $d_{3,1}$, and $d_{4,1}$ may be 0, 2, 2, 4, respectively, and the predetermined values $b_{n,1}$s of the parameters $d_{1,1}$, $d_{2,1}$, $d_{3,1}$, and $d_{4,1}$ may be 8, 40, 40, 72, respectively.

It may be noted that, the operations 931 to 934 may be performed in any sequence, and one or more of the operations 931 to 934 may be combined or split. For example, the operation 932 may be performed before the operation 931, in parallel with the operation 931, or after the operation 931.

In 935, the weight sub-unit 730 may obtain the weight $w_{1,i}$ associated with the pixel $P_{1,i}$ and the weight $w_{2,i}$ associated with the pixel $P_{2,i}$ using the Function (6) and Function (7) (k=1). In the Iteration I, the parameters $coe_{1,1}$, $coe_{2,1}$, $coe_{3,1}$, and $C_1$ may be 4, 25, 60, and 64, respectively. With the difference indicator $D_i$ obtained in the operation 931 and the parameters $d_{1,1}$, $d_{2,1}$, $d_{3,1}$, and $d_{4,1}$ obtained in the operation 934, via the Function (6) and Function (7), the weight sub-unit 730 may obtain the weights $w_{1,i}$ and $w_{1,i}$.

In 936, the updating sub-unit 740 may obtain the updated high-frequency component $V'_{1,i\_h}$ of the pixel $P_{1,i}$ based on the weights $w_{1,i}$ and $w_{1,i}$ obtained in the operation 935 and the high-frequency components $V_{1,i\_h}$ and $V_{2,i\_h}$ obtained in the operation 933 using the Function (9).

In some embodiments, the operations 935 and 936 may be combined as a single operation. The updating sub-unit 740 may obtain the updated high-frequency component $V'_{1,i\_h}$ of the pixel $P_{1,i}$ using the Functions (11) to (14).

In 937, the output value sub-unit 750 may modify the pixel $P_{1,i}$. The output value sub-unit 750 may obtain an output value $O_i$ based on the updated high-frequency component $V'_{1,i\_h}$ obtained in the operation 936 and the low-frequency component $V_{1,i\_l}$ obtained in the operation 932 using the Function (10), and then replace the value $V_{1,i}$ of the pixel $P_{1,i}$ with the output value $O_i$.

After the operation 937, the operation 930 may be re-performed to detect whether the processing of the image processing region $R_1$ is completed and operate in accordance with the detection result. Until the processing of the image processing region $R_1$ is completed, the operations 930 to 937 may be repeated for each window region set with the sliding window. As all the window regions are within the image processing region $R_1$, and only the center pixels of the window regions are modified, after the processing of the 13×13 image processing region $R_1$ is completed, only part of the pixels in the image processing region $R_1$ is modified. The modified pixels may form a 9×9 processed region (e.g., the region 1040 illustrated in FIGS. 10 and 14) in the image processing region $R_1$.

When the processing of the image processing region $R_1$ is completed, operation 938 may be triggered to start the second iteration (iteration II) for processing the tile. In 938, the image processing region unit 510 may set the 9×9 processed region 1040 as the image processing region $R_2$.

The second iteration (iteration II) may be performed on the image processing region $R_2$. Operations 940 to 948 of the iteration II may be similar to the operations 930 to 938 of the iteration I. In some embodiments, some parameters for modifying the pixels in the processing region $R_2$ may be different from those for modifying the pixels in the processing region $R_1$.

In 940, the first detection unit 570 may detect whether the processing of the image processing region $R_2$ is completed. Upon a detection that the processing of the image processing region $R_2$ is completed, the first detection unit 570 may cause the operation 948 to be triggered to initiate a processing of the tile for the third iteration (Iteration III). Upon a detection that the processing of the image processing region $R_2$ is not completed, the first detection unit 570 may cause the window region unit 520 to set a window region $W_j$ by running a 5×5 sliding window, as illustrated in FIG. 14. j may be a positive integer between 1 and the total number of window regions to be set in the Iteration II.

For example, at the first time to set a window region $W_j$, in the Iteration II, the window region unit 520 may set a window region $W_1$ (e.g., window region 1420 in FIG. 14) within the image processing region $R_1$. The window region $W_1$ may correspond to the initial position of the 5×5 sliding window in the Iteration II. Then at the next time to set a window region, the window region unit 520 may move the sliding window to its second position, and set a window region $W_2$ (e.g., window region 1421 in FIG. 14) corresponding to the second position of the sliding window, and so on.

After the window region $W_j$ is set, the first pixel block unit 530 may read image data of a pixel block $B_{1,j}$ covered by the window region $W_j$ in the first image, and the second pixel block unit 540 may read image data of a pixel block $B_{2,j}$ in the second image corresponding to the pixel block $B_{1,j}$. The pixel block $B_{1,j}$ may have a center pixel $P_{1,j}$ (e.g., the pixel 1430 for the window region 1420) and the pixel block $B_{2,j}$ may have a center pixel $P_{2,j}$ corresponding to the pixel $P_{1,j}$. The pixel $P_{1,j}$ may be the pixel to be modified in the window region $W_j$.

In 941, the difference indicator unit 550 may compute a difference indicator $D_j$ indicating a difference between the pixel block $B_{1,j}$ and the pixel block $B_{2,j}$. The difference indicator unit 550 may compute the difference indicator $D_1$ by:

$$D_j=\mathrm{abs}(\overline{G}_{1,j}-\overline{G}_{2,i}), \qquad \text{Function (20)}$$

where $\overline{G}_{1,j}$ is the mean of pixel values of the green pixels in the pixel block $B_{1,j}$, and $\overline{G}_{2,j}$ is the mean of pixel values of the green pixels in the pixel block $B_{2,j}$.

In 942, the low-frequency component sub-unit 710 may obtain the low-frequency component $V_{1,j\_l}$ of the pixel $P_{1,j}$ and the low-frequency component $V_{2,j\_l}$ of the pixel $P_{2,j}$.

In 943, the high-frequency component sub-unit 720 may obtain the high-frequency component $V_{1,j\_l}$ of the pixel $P_{1,j}$ and the high-frequency component $V_{1,j\_l}$ of the pixel $P_{2,j}$.

Descriptions of the operations 941 to 943 may be similar to the operations 931 to 933.

In 944, the weight sub-unit 730 may adjust parameters $d_{1,2}$, $d_{2,2}$, $d_{3,2}$, and $d_{4,2}$ of the Function (6) using the Function (8) (k=2). The weight sub-unit 730 may retrieve the mean $\overline{G}_{1,j}$ obtained in the operation 931 or the low-frequency component $V_{1,j\_l}$ as the brightness indicator $L_j$ to be used in the Function (8). In the Iteration II, the predetermined values $a_{n,2}$s of the parameters $d_{1,2}$, $d_{2,2}$, $d_{3,2}$, and $d_{4,2}$ may be 0, 4, 4, 6, respectively, and the predetermined values $b_{n,2}$s of the parameters $d_{1,2}$, $d_{2,2}$, $d_{3,2}$, and $d_{4,2}$ may be 12, 35, 50, 80, respectively.

It may be noted that, the operations 941 to 944 may be performed in any sequence, and one or more of the operations 941 to 944 may be combined or split.

In 945, the weight sub-unit 730 may obtain the weight $w_{1,j}$ associated with the pixel $P_{1,j}$ and the weight $w_{2,j}$ associated with the pixel $P_{2,j}$ using the Function (6) and Function (7) (k=2). In the Iteration II, the parameters $coe_{1,2}$, $coe_{2,2}$, $coe_{3,2}$, and $C_2$ may be 10, 35, 60, and 64, respectively. With the difference indicator $D_j$ obtained in the operation 941 and the parameters $d_{1,2}$, $d_{2,2}$, $d_{3,2}$, and $d_{4,2}$ obtained in the operation 944, via the Function (6) and Function (7), the weight sub-unit 730 may obtain the weights $w_{1,j}$ and $w_{2,j}$.

In 946, the updating sub-unit 740 may obtain the updated high-frequency component $V'_{1,j\_h}$ of the pixel $P_{1,j}$ based on the weights $w_{1,j}$ and $w_{2,j}$ obtained in the operation 945 and the high-frequency components $V_{1,j\_h}$ and $V_{1,j\_h}$ obtained in the operation 943 using Function (9).

In some embodiments, the operations 945 and 946 may be combined as a single operation. The updating sub-unit 740 may obtain the updated high-frequency component $V'_{1,j\_h}$ of the pixel $P_{1,j}$ using the Functions (11) to (14).

In 947, the output value sub-unit 750 may modify the pixel $P_{1,j}$. The output value sub-unit 750 may obtain an output value $O_j$ based on the updated high-frequency component $V'_{1,j\_h}$ obtained in the operation 946 and the low-frequency component $V_{1,j\_l}$ obtained in the operation 942 using the Function (10), and then replace the value $V_{1,j}$ of the pixel $P_{1,j}$ with the output value $O_j$.

After the operation 947, the operation 940 may be re-performed to detect whether the processing of the image processing region $R_2$ is completed and operate in accordance with the detection result. Until the processing of the image processing region $R_2$ is completed, the operations 940 to 947 may be repeated for each window region set with the sliding window. After the processing of the 9×9 image processing region $R_2$ is completed, the modified pixels may form a 5×5 processed region (e.g., the region 1440 illustrated in FIG. 14).

When the processing of the image processing region $R_2$ is completed, operation 938 may be triggered to start the third iteration (iteration III) for processing the tile. In 938, the image processing region unit 510 may set the 5×5 processed region as the image processing region $R_3$.

The third iteration (iteration III) may be performed on the image processing region $R_3$. As the image processing region $R_3$ could only afford a single window region, operations 950 to 957 may only be performed once. However, although not illustrated in FIG. 9, in some embodiments, the first detection unit 570 may still detect whether the processing of the image processing region $R_3$ is completed in the iteration (III), and operate correspondingly (e.g., similar to the operations 930 and 940).

The whole image processing region $R_3$ (e.g., the region 1440) may be set as the only window region $W_e$ by the window region unit 520. In some embodiments, the window region unit 520 may still set the window region $W_e$ by running a 5×5 sliding window, which may only have one position on the image processing region $R_3$. After the window region $W_e$ is set, the first pixel block unit 530 may read image data of a pixel block $B_{1,e}$ covered by the window region $W_e$ in the first image, and the second pixel block unit 540 may read image data of a pixel block $B_{2,e}$ in the second image corresponding to the pixel block $B_{1,e}$. The pixel block $B_{1,e}$ may have a center pixel $P_{1,e}$ (e.g., the pixel 1450 illustrated in FIG. 4) and the pixel block $B_{2,e}$ may have a center pixel $P_{2,e}$ corresponding to the pixel $P_{1,e}$. The pixel $P_{1,e}$ may be the pixel to be modified in the window region $W_e$.

Operations 951 to 958 of the iteration III may be similar to the operations 931 to 938 of the iteration I. In some embodiments, some parameters for modifying the pixel $P_{1,e}$ in the processing region $R_3$ are changed. An operation 960 is further introduced into the iteration III to modify the pixel $P_{1,e}$ based further on a reference difference indicator $D_j$. The reference difference indicator $D'_e$ may be obtained for modifying the pixel $P_{2,e}$ during performing the process 900 on the frame $F_{f-1}$. The difference indicator $D'_e$ may be stored in a storage device 950 (e.g., the RAM 240, the storage device 220, a cache of the processor 210).

In some embodiments, the storage device 950 and the storage device 925 may be different storage units of a same double data rate (DDR) memory.

In 951, the difference indicator unit 550 may compute a difference indicator $D_e$ indicating a difference between the pixel block $B_{1,e}$ and the pixel block $B_{2,e}$. The difference indicator unit 550 may compute the difference indicator $D_e$ by:

$$D_e = \mathrm{abs}(\overline{G}_{1,e} - \overline{G}_{2,e}), \qquad \text{Function (21)}$$

where $\overline{G}_{1,e}$ is the mean of pixel values of the green pixels in the pixel block $B_{1,e}$, and $\overline{G}_{2,e}$ is the mean of pixel values of the green pixels in the pixel block $B_{2,e}$. The obtained difference indicator $D_e$ may be stored in the storage device 960 and be used as a reference parameter to process the frame $F_{f+1}$ (if any) of the digital video stream.

In 952, the low-frequency component sub-unit 710 may obtain the low-frequency component $V_{1,e\_l}$ of the pixel $P_{1,e}$ and the low-frequency component $V_{2,e\_l}$ of the pixel $P_{2,e}$.

In 953, the high-frequency component sub-unit 720 may obtain the high-frequency component $V_{1,e\_h}$ of the pixel $P_{1,e}$ and the high-frequency component $V_{2,e\_h}$ of the pixel $P_{2,e}$.

Descriptions of the operations 952 and 953 may be similar to the descriptions of the operations 932 and 933.

In 954, the weight sub-unit 730 may adjust parameters $d_{1,3}$, $d_{2,3}$, $d_{3,3}$, and $d_{4,3}$ of the Function (6) using the Function (8) (k=3). The weight sub-unit 730 may retrieve the mean $\overline{G}_{1,e}$ obtained in the operation 951 or the low-frequency component $V_{1,e\_l}$ as the brightness indicator $L_e$ to be used in the Function (8). In the Iteration III, the predetermined values $a_{n,3}$s of the parameters $d_{1,3}$, $d_{2,3}$, $d_{3,3}$, and $d_{4,3}$ may be 0, 4, 4, 6, respectively, and the predetermined values $b_{n,2}$s of the parameters $d_{1,3}$, $d_{2,3}$, $d_{33}$, and $d_{43}$ may be 20, 40, 64, 100, respectively.

In 950, the weight sub-unit 730 may retrieve the reference difference indicator $D'_e$ for adjusting parameters $coe_{1,3}$, $coe_{2,3}$, and $coe_{3,3}$ of the Function (6) (k=3). For example, the weight sub-unit 730 may first obtain a threshold $T_e$, and then determine the parameters $coe_{1,3}$, $coe_{2,3}$, and $coe_{3,3}$ based on the reference difference indicator $D'_e$ and a threshold $T_e$.

The weight sub-unit 730 may determine the threshold $T_e$ based on the brightness indicator $L_e$ used in the operation 954. When $L_e$ is less than or equal to 8 (or any other proper value), the threshold $T_e$ may have a value of 4; when $L_e$ is greater than or equal to 255 (or any other proper value), the threshold $T_e$ may have a value of 40; and when $L_e$ is between 8 and 255, the value of the threshold $T_e$ may be obtained by the weight sub-unit 730 via linear interpolation (e.g., similar to the Function (8)).

When $D'_e > T$, the weight sub-unit 730 may set the parameters $coe_{1,3}$, $coe_{2,3}$, and $coe_{3,3}$ as 40, 50, and 64, respectively; otherwise, the weight sub-unit 730 may set the parameters $coe_{1,3}$, $coe_{2,3}$, and $coe_{3,3}$ as 10, 35, and 64, respectively.

It should be noted that, the operations 950 to 954 may be performed in any sequence, and one or more of the operations 950 to 954 may be combined or split.

In 955, the weight sub-unit 730 may obtain the weight $w_{1,e}$ associated with the pixel $P_{1,e}$ and the weight $w_{2,e}$ associated with the pixel $P_{2,e}$ using the Function (6) and Function (7) (k=3). In the Iteration III, the parameter $C_3$ may be 64. With the parameters $coe_{1,3}$, $coe_{2,3}$, and $coe_{3,3}$, obtained in the operation 950, the difference indicator $D_e$ obtained in the operation 951 and the parameters $d_{1,3}$, $d_{2,3}$, $d_{3,3}$, and $d_{4,3}$ obtained in the operation 954, via the Function (6) and Function (7), the weight sub-unit 730 may obtain the weights $w_{1,e}$ and $w_{2,e}$.

In 956, the updating sub-unit 740 may obtain the updated high-frequency component $V'V_{1,e\_h}$ of the pixel $P_{1,e}$ based on the weights $w_{1,e}$ and $w_{2,e}$ obtained in the operation 955 and the high-frequency components $V_{1,e\_h}$ and $V_{2,e\_h}$ obtained in the operation 953 using the Function (9).

In some embodiments, the operations 955 and 956 may be combined as a single operation. The updating sub-unit 740 may obtain the updated high-frequency component $V'V_{1,e\_h}$ of the pixel $P_{1,e}$ using the Functions (11) to (14).

In 957, the output value sub-unit 750 may modify the pixel $P_{1,e}$. The output value sub-unit 750 may obtain an output value $O_e$ based on the updated high-frequency component $V'V_{1,e\_h}$ obtained in the operation 956 and the low-frequency component $V_{1,e\_l}$ obtained in the operation 952 using the function (10), and then replace the value $V_{1,e}$ of the pixel $P_{1,e}$ with the output value $O_e$.

After the operation 947, the processing of the image processing region $R_3$ may be completed. Meanwhile, the processing of the whole 13×13 tile is also completed.

It may be noted that, although not mentioned in the above descriptions and not illustrated in the FIG. 9, each time the first detection unit 570 detects that the processing of the corresponding image processing region (e.g., $R_1$, $R_2$, and $R_3$) is completed, the second detection unit 580 may detect whether the processing of the whole tile is completed. Upon a detection that the processing of the whole tile is completed, the second detection unit 580 may trigger the operation 970 to output image data of the processed tile. The outputted image data may also be stored in the storage device 925. Upon a detection that the processing of the whole tile is not completed, the second detection unit 580 may start the next iteration, causing the image processing region unit 510 to set the corresponding image processing region. As illustrated in FIG. 9, the second detection unit 580 may detect whether a total of three iterations have been performed to determine whether the processing of the whole tile is completed.

It may be noted that, the process 900 is only for demonstration purposes and not intended to be limiting. Parameters provided in the process 900 may be altered based on actual needs. For example, the size of the tile may be larger than 13×13, and the number of iterations to be performed may be more than three. As another example, the predetermined parameters for obtaining weights such as $coe_{1,1}$, $C_1$, $a_{n,1}$, and $b_{n,1}$ may also be adjusted for achieving higher performance. One or more additional operations may also be introduced into the process 900. For example, the iteration I and the iteration II may also include an operation similar to the operation 950, and the corresponding weights for processing a pixel in the frame $F_f$ may be determined based further on a difference indicator (reference difference indicator) for processing the corresponding pixel in the frame $F_{f-1}$. The reference difference indicator may be the last or latest difference indicator determined for processing the corresponding pixel in the frame $F_{f-1}$.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A system for processing an image, the system comprising:
 a storage medium, including a set of instructions; and
 at least one processor in communication with the storage medium, when executing the set of instructions, the at least one processor is to:
 select one or more tiles in a first image;
 perform, for each of the one or more tiles, an image processing operation on an image processing region within the tile based on a second image for K iterations, decreasing the size of the image processing region with each iteration, wherein K is an integer above 2, and wherein
 in each iteration of the K iterations, the image processing operation modifies pixel values of one or more pixels within the image processing region, the one or more modified pixels forming a processed region having a size smaller than the size of the corresponding image processing region; and
 the at least one processor is further to:
 designate the processed region of a current iteration as the image processing region of a next iteration.

2. The system of claim 1, wherein to perform the image processing operation on the image processing region, in each iteration of the K iterations, the at least one processor is to:
 set one or more window regions by running a sliding window on the image processing region, wherein each of the one or more window regions corresponds to a first block of pixels of the first image, the first block of pixels including a first pixel of interest; and
 determine an output value for each of the one or more window regions to modify the first pixel of interest.

3. The system of claim 2, wherein to determine the output value for each of the one or more window regions, the at least one processor is to:
 obtain, from the second image, a second block of pixels corresponding to the first block of pixels, the second block of pixels including a second pixel of interest corresponding to the first pixel of interest;
 compute a difference indicator indicating a difference between the first block of pixels and the second block of pixels; and compute the output value based on at least the difference indicator, a pixel value of the first pixel of interest, and a pixel value of the second pixel of interest.

4. The system of claim 3, wherein:
the first image and the second image are formatted according to a filter color array.

5. The system of claim 4, further comprising:
an image sensor covered by the color filter array, wherein the first image and the second image are generated by the image sensor.

6. The system of claim 4, wherein to compute the difference indicator, the at least one processor is to:
compute a first mean of pixel values of pixels having a predetermined color in the first block of pixels;
determine a second mean of pixel values of pixels having the predetermined color in the second block of pixels; and
determine the difference indicator at least based on a difference between the first mean and the second mean.

7. The system of claim 3, wherein to compute the output value, the at least one processor is to:
obtain a first high-frequency component of the first pixel of interest and a first low-frequency component of the first pixel of interest;
obtain a second high-frequency component of the second pixel of interest;
compute an updated high-frequency component of the first pixel of interest at least based on the first difference indicator, the first high-frequency component, and the second high-frequency component; and
obtain the output value based on the updated high-frequency component of the first pixel of interest and the first low-frequency component.

8. The system of claim 7, wherein to compute the updated high-frequency component of the first pixel of interest, the at least one processor is to:
obtain, based at least on the first difference indicator, weights associated with the first pixel of interest and the second pixel of interest; and
compute a weighted sum or weighted mean of the original high-frequency component of the first pixel of interest and the high-frequency component of the second pixel of interest as the updated high-frequency component.

9. The system of claim 8, wherein in at least one iteration of the K iterations, for each of the one or more window region, the at least one processor is further to:
determine a brightness indicator indicating a brightness of the first block of pixels, wherein the first weight and the second weight are determined based further on the brightness indicator.

10. The system of claim 8, wherein:
the second image is obtained by processing a third image;
in at least one iteration of the K iterations, for each of the one or more window regions, the first weight and the second weight are determined based further on a reference parameter associated with the second pixel of interest; and
the at least one processor is further to, in the Kth iteration of the K iterations, for each of the one or more window regions, store the first difference indicator as the reference parameter associated with the first pixel of interest.

11. A method for processing an image, implemented on an image processing device, the method comprising:
selecting, by the image processing device, one or more tiles in a first image;
performing, by the image processing device, for each of the one or more tiles, an image processing operation on an image processing region within the tile based on a second image for K iterations, decreasing the size of the image processing region with each iteration, wherein K is an integer above 2, and wherein
in each iteration of the K iterations, the image processing operation modifies pixel values of one or more pixels within the image processing region, the one or more modified pixels forming a processed region having a size smaller than the size of the corresponding image processing region; and
the method further comprises:
designating the processed region of a current iteration as the image processing region of a next iteration.

12. The method of claim 11, wherein the performing an image processing operation on an image processing region includes, in each iteration of the K iterations:
setting one or more window regions by running a sliding window on the image processing region, wherein each of the one or more window regions corresponds to a first block of pixels of the first image, the first block of pixels including a first pixel of interest; and
determining an output value for each of the one or more window regions to modify the first pixel of interest.

13. The method of claim 12, wherein the determining an output value for each of the one or more window regions comprises:
obtaining, from the second image, a second block of pixels corresponding to the first block of pixels, the second block of pixels including a second pixel of interest corresponding to the first pixel of interest;
computing a difference indicator indicating a difference between the first block of pixels and the second block of pixels; and
computing the output value based on at least the difference indicator, a pixel value of the first pixel of interest, and a pixel value of the second pixel of interest.

14. The method of claim 13, wherein the computing the output value includes:
obtaining a first high-frequency component of the first pixel of interest and a first low-frequency component of the first pixel of interest;
obtaining a second high-frequency component of the second pixel of interest;
computing an updated high-frequency component of the first pixel of interest at least based on the first difference indicator, the first high-frequency component, and the second high-frequency component; and
obtaining the output value based on the updated high-frequency component of the first pixel of interest and the first low-frequency component.

15. The method of claim 14, wherein the computing the updated high-frequency component of the first pixel of interest comprises:
obtaining, based at least on the first difference indicator, weights associated with the first pixel of interest and the second pixel of interest; and
computing a weighted sum or weighted mean of the original high-frequency component of the first pixel of interest and the high-frequency component of the second pixel of interest as the updated high-frequency component.

16. The method of claim 15, further comprising:
in at least one iteration of the K iterations, for each of the one or more window regions:

determining a brightness indicator indicating a brightness of the first block of pixels, wherein the first weight and the second weight are determined based further on the brightness indicator.

17. The method of claim 15, wherein:

the second image is obtained by processing a third image;

in at least one iteration of the K iterations, for each of the one or more window regions, the first weight and the second weight are determined based further on a reference parameter associated with the second pixel of interest; and the method further comprises, in the Kth iteration of the K iterations, for each of the one or more window regions of the Kth iteration, storing the first difference indicator as the reference parameter associated with the first pixel of interest.

18. A non-transitory computer readable medium, comprising at least one set of instructions compatible for processing an image, wherein when executed by logical circuits of an electronic device, the at least one set of instructions directs the logical circuits to:

select one or more tiles in a first image;

perform, for each of the one or more tiles, an image processing operation on an image processing region within the tile based on a second image for K iterations, decreasing the size of the image processing region with each iteration, wherein K is an integer above 2, and wherein in each iteration of the K iterations, the image processing operation modifies pixel values of one or more pixels within the image processing region, the one or more modified pixels forming a processed region having a size smaller than the size of the corresponding image processing region; and the at least one set of instructions further directs the logical circuits to:

designate the processed region of a current iteration as the image processing region of a next iteration.

19. The non-transitory computer readable medium of claim 18, wherein to perform the image processing operation on the image processing region, in each iteration of the K iterations, the at least one set of instructions directs the logical circuits to:

set one or more window regions by running a sliding window on the image processing region, wherein each of the one or more window regions corresponds to a first block of pixels of the first image, the first block of pixels including a first pixel of interest; and determine an output value for each of the one or more window regions to modify the first pixel of interest.

20. The non-transitory computer readable medium of claim 19, wherein to determine the output value for each of the one or more window regions, the at least one set of instructions directs the logical circuits to:

obtain, from the second image, a second block of pixels corresponding to the first block of pixels, the second block of pixels including a second pixel of interest corresponding to the first pixel of interest;

compute a difference indicator indicating a difference between the first block of pixels and the second block of pixels; and compute the output value based on at least the difference indicator, a pixel value of the first pixel of interest, and a pixel value of the second pixel of interest.

* * * * *